(12) United States Patent
Iarochenko et al.

(10) Patent No.: US 6,372,371 B1
(45) Date of Patent: Apr. 16, 2002

(54) ECOLOGICALLY CLEAN MECHANICALLY RECHARGEABLE AIR-METAL CURRENT SOURCE

(75) Inventors: Alexander M. Iarochenko, Toronto (CA); Evgeny B. Kulakov, Moscow (RU); Oleg I. Krakhin, Moscow (RU); Stanislavs D. Sevruk, Moscow (RU)

(73) Assignee: Eontech Group, Inc, Toronto (CA)

( * ) Notice: Subject to any disclaimer, the term of this patent is extended or adjusted under 35 U.S.C. 154(b) by 0 days.

(21) Appl. No.: 09/522,927

(22) Filed: Mar. 10, 2000

Related U.S. Application Data

(60) Provisional application No. 60/162,204, filed on Oct. 29, 1999.

(51) Int. Cl.$^7$ ................................................ H01M 6/24
(52) U.S. Cl. ......................... 429/27; 429/229; 429/232
(58) Field of Search ........................... 429/27, 229, 232

(56) References Cited

U.S. PATENT DOCUMENTS

| | | | |
|---|---|---|---|
| 2,597,117 A | | 5/1952 | Schumacher |
| 3,186,836 A | * | 6/1965 | Pryor et al. ................ 420/548 |
| 3,368,952 A | * | 2/1968 | Pryor et al. ................ 205/732 |
| 3,392,057 A | | 7/1968 | Eiichi et al. |
| 3,393,138 A | * | 7/1968 | Hine ........................... 205/732 |
| 3,840,406 A | | 10/1974 | Depoix |
| 3,880,671 A | | 4/1975 | Kordesch et al. |
| 4,950,560 A | * | 8/1990 | Tarcy .......................... 429/27 |
| 5,206,096 A | | 4/1993 | Goldstein et al. |

FOREIGN PATENT DOCUMENTS

| | | |
|---|---|---|
| EP | 0 354 752 | 2/1990 |
| EP | 0 358 335 | 3/1990 |
| EP | 0 582 293 | 2/1994 |
| GB | 1 298 812 | 12/1972 |
| GB | 2 020 478 | 11/1979 |
| WO | WO 00 36686 | 6/2000 |

OTHER PUBLICATIONS

Chemical Abstracts, vol. 114, No. 8, ISSN: 0009–2258, "Mass transfer in unsealed batteries . . . ".

J. of Power Sources, vol. 58, 1996, pp 183–187, "Complex behaviour of aliminium dissolution . . . ".

J. of Electrochem. Soc., vol. 110, No. 4, pp 267–271, "Control of Al Corrosion in Caustic Solutions".

(List continued on next page.)

*Primary Examiner*—Hoa Van Le
(74) *Attorney, Agent, or Firm*—R. Craig Armstrong

(57) ABSTRACT

A mechanically rechargeable air-metal source of current having one or more non-consumable gas diffusion positive electrode(s), one or more consumable negative metal electrode(s), an electrolyte based on water solutions of salts and/or bases and a housing enclosing the positive electrode(s) and the negative electrode(s), to create an inter-electrode gap, together with the electrolyte. The negative electrode(s) comprise(s) a metal selected from the group consisting of aluminum, zinc, magnesium, and alloys thereof, and further comprise(s) an effective amount of one or more additives selected from the group consisting of Ga, In, TI, Sn, Cd, Pb, Mn, and Fe. The effective amount of the additives improves the electrochemical characteristics of the negative electrode, reducing corrosion, and preserves the negative electrode(s) while being stored. The electrolyte is a salt solution, an alkali solution or a mixture of a salt solution and an alkali solution. The electrolyte may further have an addition of $Sn^{+4}$, $Pb^{+4}$, $Ga^{+3}$, $In^{+3}$, poly-saccharide-based on D-glucose, polyesters incl. amides, 2–3 C alcohols and halogenides/hydroxides of alkaline metals, to provide a decrease in anode corrosion during discharge, an increase in electric capacity of said electrolyte, a decrease of freezing temperature of said electrolyte, a change of chemical reaction results into microcrystalline form and stabilization of said electrolyte during storage.

34 Claims, 24 Drawing Sheets

OTHER PUBLICATIONS

World Patents Index database, Sect. Ch, Week 199826, Class L03, AN 1998–296155.

World Patents Index database, Sect. Ch, Week 199827, Class L03, AN 1998–310405.

Patent Abstracts of Japan, vol. 1995, No. 02, Mar. 31, 1995 JP 06 325754 A, abstract.

J. Electrochem. Soc., vol. 137, No. 6, Jun. 1990, pp 1854–1851, n–Butylferrocene for Overcharge Protection of Secondary Lithium Batteries.

J. Electrochem. Soc., vol. 139, No. 6, Jun. 1992, pp 1499–1502, "Electrochemical Properties of Aluminum in Weakly Acidic Sodium Chloride Solutions".

J. of Power Sources, vol. 22, 1988, pp 261–267, "Aluminum–Oxygen Batteries for Space Applications".

J. of Applied Electrochem., vol. 20, 1990, pp 405–417, "Development of anodes for aluminium/air batteries—solution phase inhibition of corrosion".

* cited by examiner

1-Volt-Ampere Characteristic of the anode formation reaction
2-Volt-Ampere Characteristic of the cathode emission of hydrogen
3-Volt-Ampere Characteristic of the anode corrosion reaction
4-Total Volt-ampere characteristic of the anode Battery Volt-Ampere Characteristics
with different additives incorporated into aluminum anode A95
1-additives Ga[0.01 mass%]; 2-additives Jn[0.5 mass%]; 3-additives Tl[0.015 mass%];
4-additives Sn[0.15 mass%]; 5-additives Cd[0.01 mass%]; 6-additives Pb[0.02 mass%];
7-additives Mn[0.03 mass%]; 8-additives Fe[0.01 mass%];
9-whole additives[0.01Ga+0.5Jn+0.015Tl+0.15Sn+0.01Cd+0.02Pb+0.03MnT0.01Fe+0.01 Fe]

Battery Volt-Ampere Characteristics
with different additives incorporated into aluminum anode A95
1-additives Ga[0.01 mass%]; 2-additives Jn[0.5 mass%]; 3-additives T1[0.015 mass%];
4-additives Sn[0.15 mass%]; 5-additives Cd[0.01 mass%]; 6-additives Pb[0.02 mass%];
7-additives Mn[0.03 mass%]; 8-additives Fe[0.01 mass%];
9-whole additives[0.01Ga+0.5Jn+0.015T1+0.15Sn+0.01Cd+0.02Pb+0.03MnT0.01Fe+0.01 Fe]

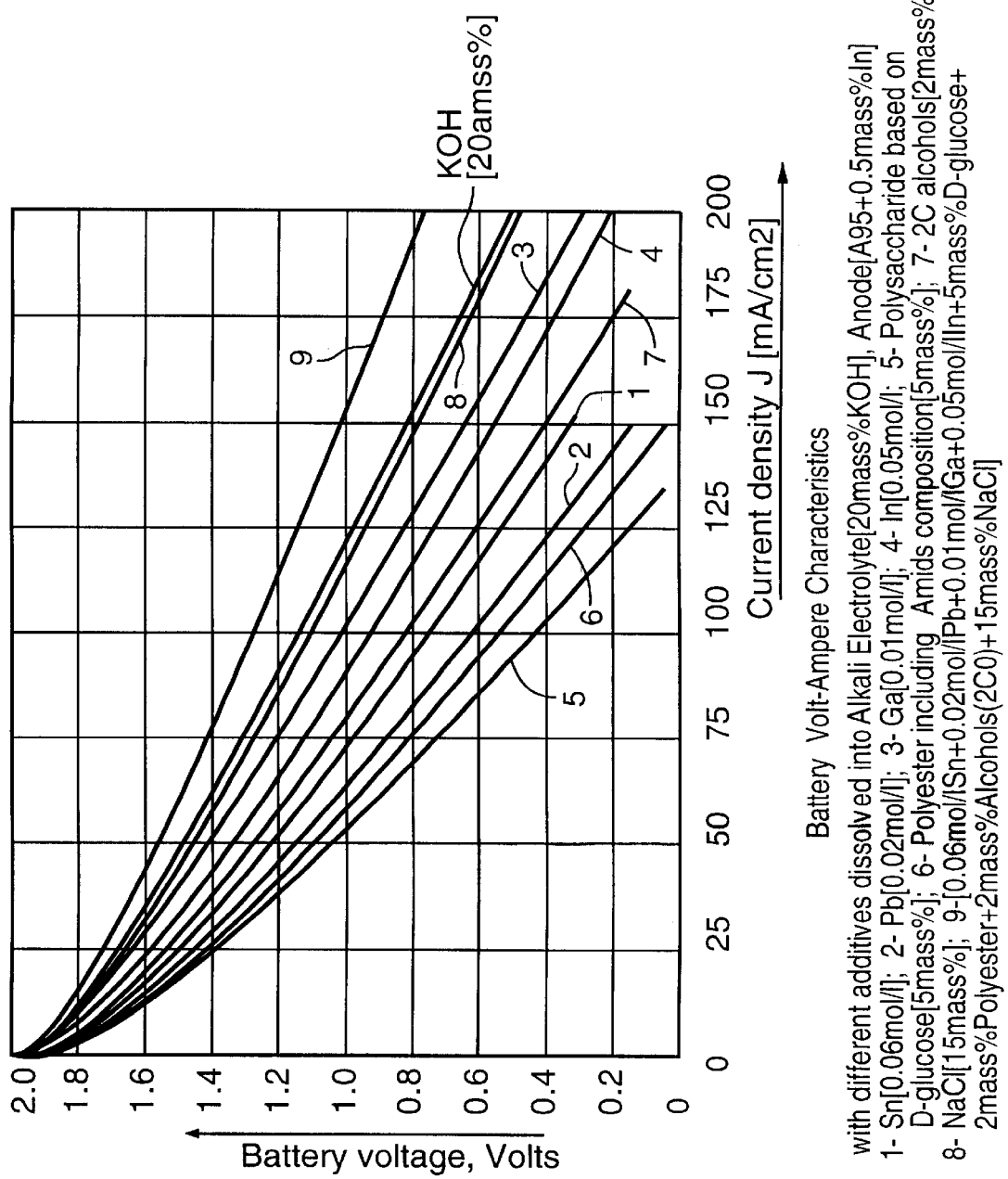

FIG. 13

Battery Volt-Ampere Characteristics
with different additives dissolved into Alkali Electrolyte[20mass%KOH], Anode[A95+0.5mass%In]
1- Sn[0.06mol/l]; 2- Pb[0.02mol/l]; 3- Ga[0.01mol/l]; 4- In[0.05mol/l; 5- Polysaccharide based on D-glucose[5mass%]; 6- Polyester including Amids composition[5mass%]; 7- 2C alcohols[2mass%]; 8- NaCl[15mass%]; 9-[0.06mol/lSn+0.02mol/lPb+0.01mol/lGa+0.05mol/lIn+5mass%D-glucose+2mass%Polyester+2mass%Alcohols(2CO)+15mass%NaCl]

1- Battery Volt-Ampere characteristics; 2- Power

ECOLOGICALLY CLEAN MECHANICALLY RECHARGEABLE AIR-METAL CURRENT SOURCE

REFERENCE TO RELATED APPLICATION

This is a formal application based on and claiming the benefit of the filing date of a provisional application filed Oct. 29, 1999, Ser. No. 60/162,204."

BACKGROUND OF THE INVENTION

1. Field of the Invention

The invention relates to electrochemical current sources, specifically air-metal electrochemical aluminum systems suitable for electronic devices, including radio telephones, portable audio and video players, video cameras, and personal computers.

2. Description of the Prior Art

There are known current sources, which contain a series of basic components including a cathode, an anode, and an electrolyte, as well as a current converter with a stabilizer. In U.S. Pat. No. 5,656,876, a battery pack of lithium solid state cells is shown, where a DC/DC converter provides a stable operating voltage, possibly also different voltages upon request. U.S. Pat. No. 5,286,578 (shows a flexible electrochemical cell having an air cathode, a metallic anode and an electrolyte chamber. The electrolyte chamber is collapsed, when the battery is shipped (without electrolyte) to save space. U.S. Pat. No. 5,554,918 shows a mechanically-rechargeable battery having a replaceable zinc anode, an air electrode (one option) and a housing. A non-spillable electrolyte is contained in the housing. When necessary, the anode can be removed and replaced with a fresh anode. Further related battery art is found in U.S. Pat. No. 5,424,147, U.S. Pat. No. 3,798,527, U.S. Pat. No. 3,876,471, U.S. Pat. No. 5,525,895, U.S. Pat. No. 5,415,949, U.S. Pat. No. 5,049,457, U.S. Pat. No. 4,925,744 and U.S. Pat. No. 6,025,694.

Different additions to an aluminum anode, used in aluminum batteries, and to the electrolyte of such batteries are disclosed in U.S. Pat. No. 5,032,474. Preferred elements for the aluminum alloy composition are Cd, Sn, Bi, Sb, In, Ge, B, Se, Te, P, As, C, Re, Pd, Nb, Si and Zn in concentrations between 0.005% and 1.0% (by weight). As an example, Sn present in binary Al alloys should range from 0.01% to 0.5%, optimally 0.02%. The electrolyte is specified as alkaline, having one or more of the elements used for the Al alloy. In U.S. Pat. No. 5,004,654, an aluminum battery is shown, which has an anode comprising Al with Mg and/or Ca and optionally also In. Sn is present either in the electrolyte or in the anode or both. No Ga is present in the anode. Further related battery art is found in U.S. Pat. No. 5,004,654, U.S. Pat. No. 4,554,131 and U.S. Pat. No. 4,906,535.

Still further background material can be found in L. l., Antropov, E. M. Makushina, V. F. Pinasenko. Inhibitors of the Corrosion of Metals. —Kiev, "Tekhnika", 1981. —184pg., N. D. Tomashov. The Theory of Corrosion and Protection of Metals. —Moscow, Academy of Sciences of the USSR, 1959., The Products of Science and Technology. The Theory of Corrosion and Corrosion Protection. Vol.9, Moscow, VINITI, 1982. —256 pg., V. V. Scorcelletti. Theoretical Background of Metal Corrosion. —Leningrad, "Khimiya", 1973. —265 pg., and A. L. Rotinyan. Theoretical Electrochemistry. —Leningrad, "Khimiya", 1981. —423 pg.

These known structures, however, have certain apparent disadvantages including:

- a limited time of uninterrupted power and the necessity of periodic recharging the electric grid using a special recharging device;
- lowering of the electric load at the rest cycle;
- use of non-renewable sources of raw materials;
- the formation of ecologically harmful waste products;
- high cost;
- low mass-energy characteristics;
- high self-discharge rates;
- high environmental impact (difficult to recycle/heavy metals);
- low energy resource.

SUMMARY OF THE INVENTION

The goals of the present invention include:

- providing an independent, self-contained, electrical source that can be mechanically recharged;
- improving the performance characteristics by refusing of electric recharging;
- increasing the time during which the electrical source will supply uninterruptable power during the conversation and waiting cycle;
- providing an electrical power source that remains environmentally and ecologically clean throughout its full life cycle, including manufacture, use, and recycling or disposal;
- lowering the cost of both manufacturing and usage.

These goals are achieved in the following manner:

The air-metal power source is made of the body containing a cathode and a replaceable unit (cartridge), containing anode and electrolyte. Thus power supply recharging is accomplished with mechanical recharging (by replacing the cartridge) and assuring a self-contained power source.

In the invention, a battery comprises at least one non-consumable gas diffusion positive electrode; at least one consumable negative metal electrode; an electrolyte based on water solutions of salts and/or bases; and a housing enclosing said electrolyte, said at least one positive electrode and said at least one negative electrode, to create an inter-electrode gap. The at least one negative electrode comprises a metal selected from the group consisting of aluminum, zinc, magnesium, and alloys thereof, and further comprises an effective amount of one or more additives selected from the group consisting of Ga, In, TI, Sn, Cd, Pb, Mn, and Fe, the effective amount of the additives improving the electrochemical characteristics of the at least one negative electrode, reducing corrosion, and preserves the at least one negative electrode while being stored.

The additives are preferably present in the following concentrations: Ga 0–5 mass %, In 0–5 mass %, TI 0–5 mass %, Sn 0–5 mass %, Cd 0–5 mass %, Pb 0–5 mass %, Mn 0–5 mass % and Fe 0–5 mass %.

The additives are more preferably present in the following concentrations: G a 0.01 mass %, In 0.5 mass %, TI 0.015 mass %, Sn 0.15 mass %, Cd 0.01 mass %, Pb 0.02 mass %, Mn 0.03 mass % and Fe 0.01 mass %.

The thickness of the at least one negative electrode is preferably in the range of 0.05 mm to 10 mm, and a volume of the electrolyte is selected to achieve balanced consumption during the discharge of the battery.

The electrolyte is preferably a salt solution, an alkali solution or a mixture of a salt solution and an alkali solution, the electrolyte further having an addition of $Sn^{+4}$, $Pb^{+4}$, $Ga^{+3}$, $In^{+3}$, poly-saccharide based on D-glucose, polyesters including amides, 2–3 C alcohols and halogenides/hydroxides of alkaline metals, to provide a decrease in anode corrosion during discharge, an increase in electric capacity of the electrolyte, a decrease of freezing temperature of the electrolyte, a change of chemical reaction results into microcrystalline form and stabilization of the electrolyte during storage.

The electrolyte advantageously comprises 0–30% KOH, 0–0.1 mol/l Sn, 0–0.1 mol/l Pb, 0–0.1 mol/l Ga, 0–0.1 mol/l In, 0–10 mass % D-glucose, 0–5 mass % alcohols, 0–5 mass % polyester and 0–20 mass % NaCl.

The electrolyte more preferably comprises 20% KOH, 0.06 mol/l Sn, 0.02 mol/l Pb, 0.01 mol/l Ga, 0.02 mol/l In, 5 mass % D-glucose, 2 mass % alcohols and 15 mass % NaCl.

The electrolyte alternatively comprises 0.02 mol/l Pb, 0.06 mol/l Sn, 0.01 mol/l Ga, 0.02 mol/l In, 5 mass % D-glucose, 2 mass % alcohols, 2 mass % polyester and 15 mass % NaCl.

The first unit further preferably comprises a porous matrix—electro-carrier, soaked in a composition based on a salt solution, an alkali solution or a mixture of a salt solution and an alkali solution, the porous matrix—electro-carrier further having an addition of $Sn^{+4}$, $Pb^{+4}$, $Ga^{+3}$, $In^{+3}$, poly-saccharide based on Dglucose, polyesters including amides, 2–3 C alcohols and halogenides/hydroxides of alkaline metals, to provide a decrease in negative electrode corrosion during discharge, an increase in electric capacity of electrolyte, a decrease of freezing temperature of the electrolyte, a change of chemical reaction results into microcrystalline form and stabilization of the electrolyte during storage.

The at least one positive electrode advantageously comprises additives selected from the group consisting of lead oxides and silver-indium alloys, to provide stabilization of properties during extended storage of the positive electrode and increase in electrochemical activity while the battery is in use.

At least one of the additives is advantageously incorporated into the at least one positive electrode comprising less than about 200 mg/cm3 of a total surface area of the at least one positive electrode.

The first unit preferably comprises at least one membrane, the membrane being permeable to hydrogen and impermeable to liquids.

The at least one positive electrode is advantageously provided with at least one fourth cavity, which is fillable with the electrolyte.

The inter-electrode gap is chosen to be the minimal possible based on construction consideration, and wherein a necessary reserve of the electrolyte is contained in at least one fifth cavity arranged in the first unit and in at least one sixth cavity arranged in the second unit.

The at least one negative electrode advantageously covers the at least one positive electrode in the shape of a pocket, the pocket being connected to surrounding atmosphere.

The at least one negative electrode is preferably substantially U-shaped and covers the electrolyte impermeable container.

The first unit further advantageously comprises a current converter, the current converter providing conversion of a direct current of the battery into an alternating current and stabilization of a voltage output by the battery.

The first unit further alternatively comprises a current converter, the current converter providing conversion of a direct voltage of the battery into a different level of voltage and stabilization of the voltage output by the battery.

The at least one negative electrode preferably comprises a hydrate metal oxide.

The at least one negative electrode alternatively comprises aluminum. The aluminium is preferably obtained following the Bayra process.

The at least one negative electrode preferably has a thickness of between 0.04 to 0.5 of a positive electrode spacing inside a volume of an active part of the second unit.

The battery further advantageously comprises a first unit, comprising the housing with the at least one positive electrode and the electrolyte, the electrolyte being held in an electrolyte impermeable container, and a second unit, comprising the at least one negative metal electrode and the electrolyte. The second unit is replaceably and sealingly arranged in the first unit, so that when the at least one negative electrode and the electrolyte are consumed, the spent second unit is removed and a fresh second unit is inserted instead of the spent second unit, and the electrolyte impermeable container is penetrated by a puncture means after the second unit has been fully inserted into the first unit, to allow the electrolyte to flow between the at least one positive electrode and the at least one negative electrode.

The battery further advantageously comprises at least one first conduit for connecting to and distributing ambient air, at least one second conduit for distributing the electrolyte, and at least one third conduit for collecting reaction products in cooperation with the at least one first conduit and the at least one second conduit.

The puncture element advantageously comprises a substantially U-shaped element having sharp ends, the puncture element being arranged inside the electrolyte impermeable container, and the battery further comprises a biasing means for pressing the electrolyte impermeable container against the sharp ends, to cause the electrolyte impermeable container to break.

The biasing means preferably comprises a thread, which is attached to the electrolyte impermeable container.

The biasing means alternatively comprises a push bar having a foot end, which contacts the electrolyte impermeable container.

The at least one positive electrode and the at least one negative electrode preferably form pairs of one positive electrode and one negative electrode, and the pairs are connected in series to produce a desired output voltage. Alternatively, the pairs are connected in parallel to produce a desired output current.

The first unit further advantageously comprises at least one first sealing means, forming a hermetic seal between the first unit and the second unit when the first unit and the second unit are engaged.

The second unit further preferably comprises at least one second sealing means, forming a hermetic seal between the first unit and the second unit when the first unit and the second unit are engaged.

Alternatively, the first unit further comprises at least one first sealing means and the second unit further comprises at least one second sealing means, the first sealing means and the second sealing means cooperating to form a hermetic seal between the first unit and the second unit when the first unit and the second unit are engaged.

The at least one positive electrode is preferably removably arranged in the first unit, to provide a possibility to replace the at least one positive electrode.

The battery further advantageously comprises a cap portion, the cap portion comprising a third sealing means and a releasable locking means, the third sealing means providing a hermetic seal between the first unit and the second unit, when the first unit and the second unit are engaged, and the releasable locking means is configured to maintain the body and the second unit in an engaged configuration until released.

BRIEF DESCRIPTION OF THE DRAWINGS

In order that the invention may be more clearly understood, the preferred embodiment thereof will now be described in detail by way of example, with reference to the accompanying drawings, in which:

FIG. 13 is a graph showing the battery voltage vs the current characteristics for different types of electrolyte compositions.

DETAILED DESCRIPTION OF THE INVENTION

Figure 1:
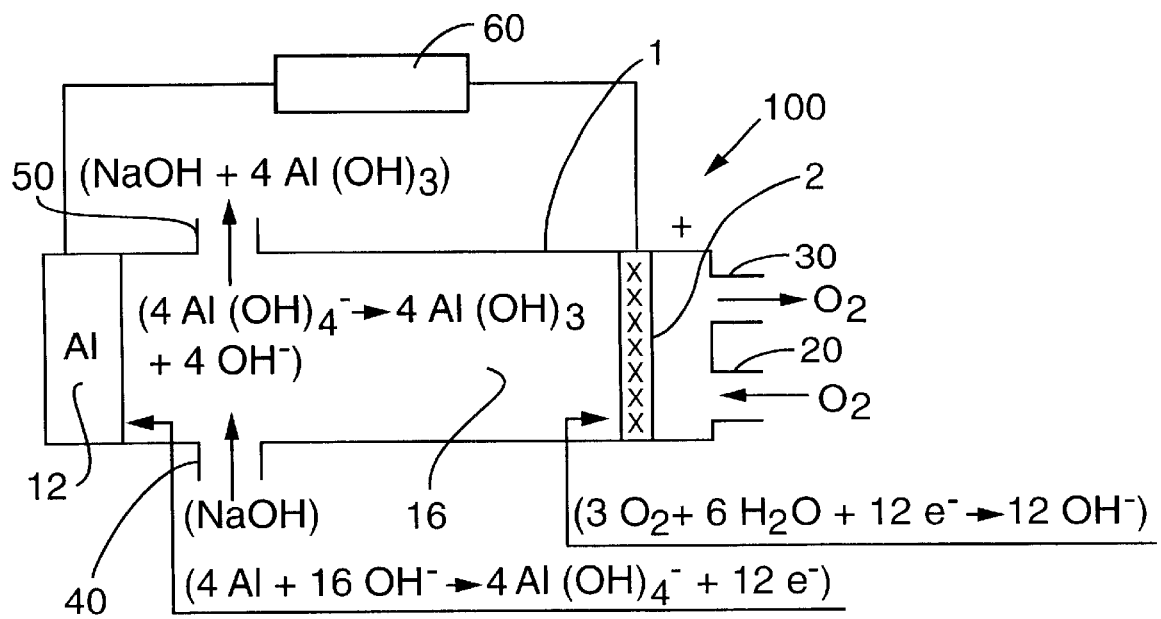
FIG. 1 is a schematic representation of a metal-air battery.

The basic electrochemical processes of the air-metal current source can be demonstrated using an air-aluminum battery or fuel-cell as example.

Aqueous solutions of alkali and salt are utilized as electrolytes in air-aluminum current sources. The following electrochemical reactions occur in the alkali solutions:

Dissociation of aluminum at the anode (negative electrode) according to equations (1) and/or (2):

$$Al + 4OH^- \rightarrow AlO_2^- + 2H_2O + 3e^- \quad (1)$$

$$Al + 4OH^- \rightarrow Al(OH)_4^- + 3e^- \quad (2)$$

The cathode reduction of the oxygen at the positive electrode (gas diffusion cathode) according to equation (3):

$$O_2 + 2H_2O + 4e^- \leftrightarrows 4OH^- \quad (3)$$

In as much as the aluminum is thermodynamically unstable, the electrochemical corrosion takes place at the anode. Equations (1) and (2) describe this process and the conjugate process is the reduction of hydrogen from water at the cathode:

$$H_2 + 2OH^- \leftrightarrows 2H_2O + 2e^- \quad (4)$$

The overall process of current generation and the corrosion reaction is described by respective equations (5) and (6) below:

$$4Al + 3O_2 + 6H_2O + 4NaOH \rightarrow 4NaAl(OH)_4 \text{ (current generation)} \quad (5)$$

$$2Al + 6H_2O + 2NaOH \rightarrow 2NaAl(OH)_4 + 3H_2\uparrow \text{ (corrosion)} \quad (6)$$

The solubility of the reaction product is limited, therefore, when the solubility limit is reached, the reaction product being to decompose according to reaction (7):

$$NaAl(OH)_4 \rightarrow NaOH + Al(OH)_3 \quad (7)$$

As a result of which the final reaction product is formed: crystalline aluminum hydroxide. This simplified scheme can be represented as a summation of equations for the current formation process:

$$4Al + 3O_2 + 6H_2O \rightarrow 4Al(OH)_3 \quad (8)$$

and for the corrosion reaction:

$$2Al + 6H_2O \rightarrow 2Al(OH)_3 + 3H_2\uparrow \quad (9)$$

FIG. 1 presents reactions, which indicate their place of origin in the air-aluminum battery. Although the reaction mechanism in neutral salt electrolytes differs from reaction mechanism in an alkali solution, the overall processes are adequately represented by equations (8) and (9). A battery 100 comprises a housing 1, an anode (negative electrode) 12 and a cathode (positive electrode) 2. A load 60 is connected to the anode and the cathode during use of the battery. Oxygen (or air) has access to the cathode via an oxygen inlet 20 and an oxygen outlet 30. An electrolyte chamber is formed within the housing, so that ions of an electrolyte 16 may flow freely between the two electrodes. Often, the electrolyte may be added to the housing via an electrolyte inlet 40 and removed from the housing via an electrolyte outlet 50. The electrolyte inlet and outlet may be one and the same, i.e. only one opening in the housing.

Figure 2A:
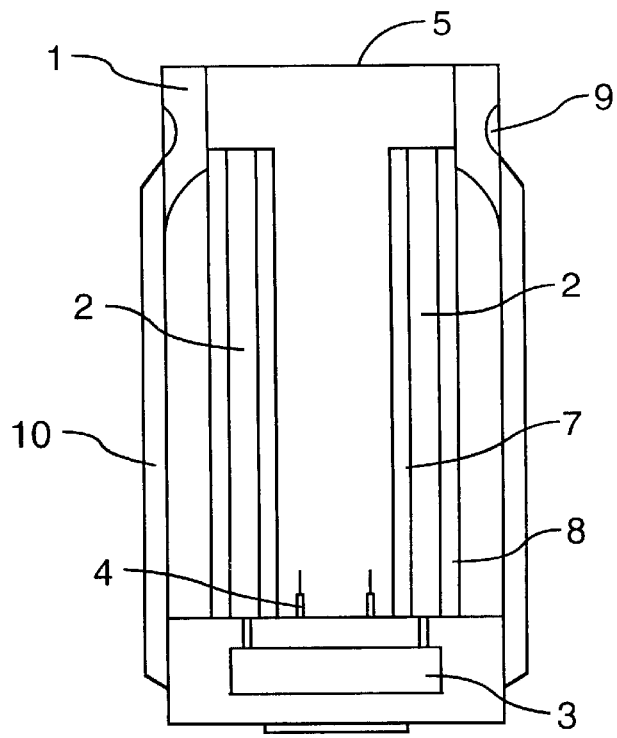
FIG. 2A is a schematic side view of a gas cathode assembly according to a first embodiment of the invention.
Figure 2B:
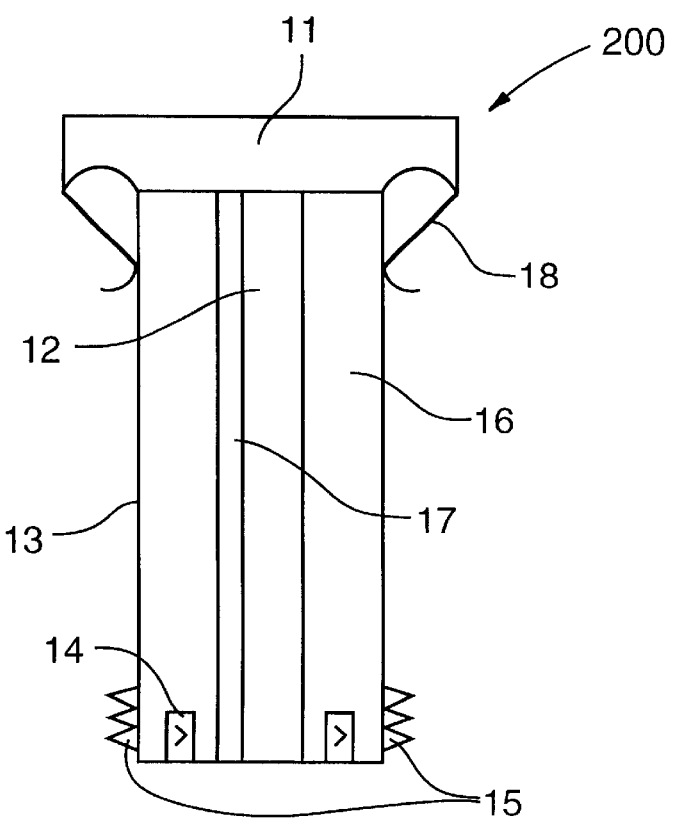
FIG. 2B is a schematic side view of an anode/electrolyte assembly according to a first embodiment of the invention.

A first embodiment of the invention is shown in FIGS. 2A and 2B. The air-metal power source has a body 1 containing a cathode 2 and a replaceable unit (cartridge) 200, containing anode 12 and electrolyte 16. Thus, power supply recharging is accomplished with mechanical recharging (by replacing the cartridge) thereby assuring a self-contained power source. FIGS. 2A and 2B thus illustrate a basic embodiment of the proposed mechanically rechargeable air-metal battery, containing one anode and two cathodes.

The battery consists of two main parts, a cathode unit (FIG. 2A) and the replacement cartridge (FIG. 2B). The battery includes one body 1, two gas-diffusion cathodes 2, and a voltage regulator 3, which may optionally include a stabilizer, a support 4 for a hermetic seal, and a sealing ring or gasket 5.

The gas diffusion cathode preferably has a current discharge mesh 6, a gas non-permeable layer 7, and a gas permeable layer 8. The body of the battery contains special grooves 9 for holding the cartridge and guides 10 for maintaining alignment of the components during assembly and mechanically reinforcing the battery body. During the corrosion of the anode, hydrogen gas is exiting to the atmosphere through the porous cathode.

The cartridge has a cover 11, an anode 12, a water impermeable membrane 13, valves 14, a brush for cleaning the cathodes 15, and an electrolyte 16. When using a thickened electrolyte, the cartridge may include an additional cavity 17 for water. The cover has flexible elements 18 for sealing and attaching the cartridge to the body of the battery.

When charging the battery, the cartridge is inserted through the opening to the support, whereupon the fixture 18 guides the cartridge along the grooves 9 and guides 10 and onto the sealing supports 4, thereby opening valves 14 to release the electrolyte and activate the battery of the cartridge. After this process the battery is ready for use (FIG. 2B). During connection to the power source, battery starts to produce electric current, based on the scheme on FIG. 1 and equations (1) to (9). The fixture 18 also includes sealing elements that form a liquid-tight seal with the body of the battery (FIG. 2A) to contain the electrolyte solution. After the cartridge and battery body have been properly engaged, when the battery is activated electrical current is produced according to the electrochemical reaction sequence previously outlined in equations (1) to (9).

Moreover, the battery body unit and cartridge are isolated from each other during the inactive mode, while for activation of the source it is necessary to mechanically place the cartridge into the battery body. The expended materials (anode and electrolyte) and reaction products formed from the use of the source are extracted during the mechanical removal of the cartridge from the battery body unit.

As a spent cartridge is withdrawn from the battery body in preparation for recharging the battery by inserting a fresh cartridge, the valves 14 are released and again seal the cartridge to contain the spent electrolyte. Also, both as the spent cartridge is withdrawn, and as the replacement cartridge is inserted, the incorporated brushes 15 clean deposits that may have formed on the cathodes.

The consumable materials, which are used in the current source according to the present invention, are ecologically pure during the production of electric current, through its use, and through its disposition through either recycling or disposal. Based on the Bayra process (regeneration to produce the anode metal), metal oxide hydrate, for instance aluminum, serves as an initial source to produce the anode material. Furthermore, the spent electrolyte and the aluminum oxide hydrate can be used for recycling.

The optimum sizes are selected so that the thickness of the anode is between 0.04 to 0.5 of the cathode spacing ($T_K$) of the volume of an active part of the cartridge, V, (not considering the cartridge cover 11, FIG. 2B) and are expressed with the following mathematical expressions:

$V = V_e + V_a;$ $V_e = V_{ezh} + V_{ez};$ $V_e = q_e Q_k P_{k1}$;

$V_a = (q_{ax} + q_{akor}) Q_k P_{k2}$;

Where $V_e$=is the volume of the electrolyte capacity, cm³

$V_{ezh}$=volume of the liquid electrolyte composition, cm³

$V_{ez}$=volume of the thickened electrolyte composition, cm³

$q_e$=specific consumption of water from the electrolyte, cm³/A-hr;

$Q_k$=energy capacity (electrical capacity) active part of the cartridge, A-hr;

$P_{k1}$=(0.35–1.8)—construction parameter $V_a$=volume of spent anode material cm³;

$q_{ax}$=specific expenditure of abode material for the electrochemical reaction cm³/A hr;

$q_{akor}$=specific expenditure of anode material during corrosion cm³/A hr;

$p_{k2}$=(1.3–2.0)—second construction parameter;

Ratios between the clearance dimensions of the cartridge length ($L_k$) width ($T_k$) and height ($H_k$) is within the range of 1:(0.17–0.35):(1.74).

In order to attain the required volt-ampere characteristics, the battery can contain 1,2 . . . N (N is any positive integer) of cathodes and N+1 or N−1 of anodes connected to each other in series, in parallel, or combinations thereof.

The consumable metal anode, preferably an aluminum or aluminum alloy anode, inside the cartridge, is situated inside the cathode assembly between gas diffusion electrodes (cathodes) at a specified distance for placement of electrolyte, during use of the battery.

Figure 7:
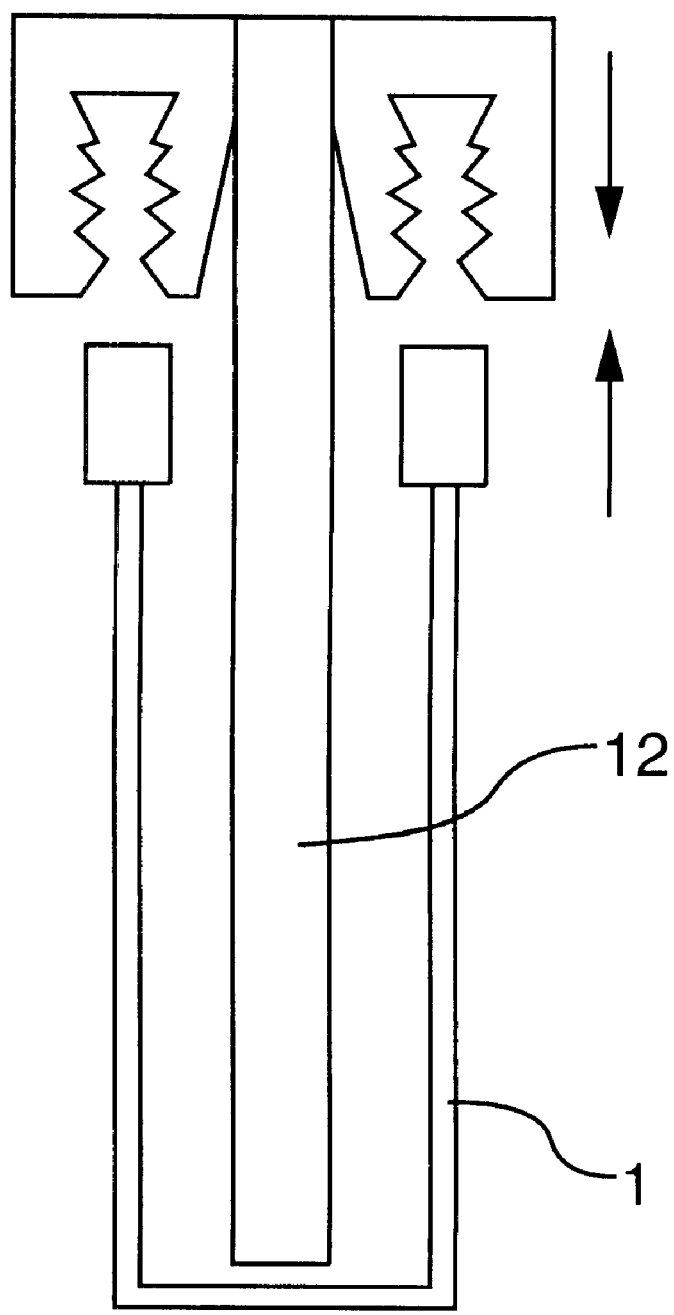
FIG. 7 is a schematic side view of a hermetic seal according to a second embodiment of the invention.

The cartridge preferably includes two separate sealing means. The first sealing means is the packing material, which assures a hermetic seal of the cartridge during storage. The packing material is automatically opened when the replaceable anode cartridge is placed into engagement with the corresponding cathode assembly. The second sealing means is a seal for providing hermetic closure after the cartridge (FIG. 2B and FIG. 7) is placed into engagement with the cathode assembly.

The electrolyte and anode used are ecologically safe when decomposed, allowing the chemical reaction products to be discarded or, preferably, recycled to extract the anode metal.

Figure 16:
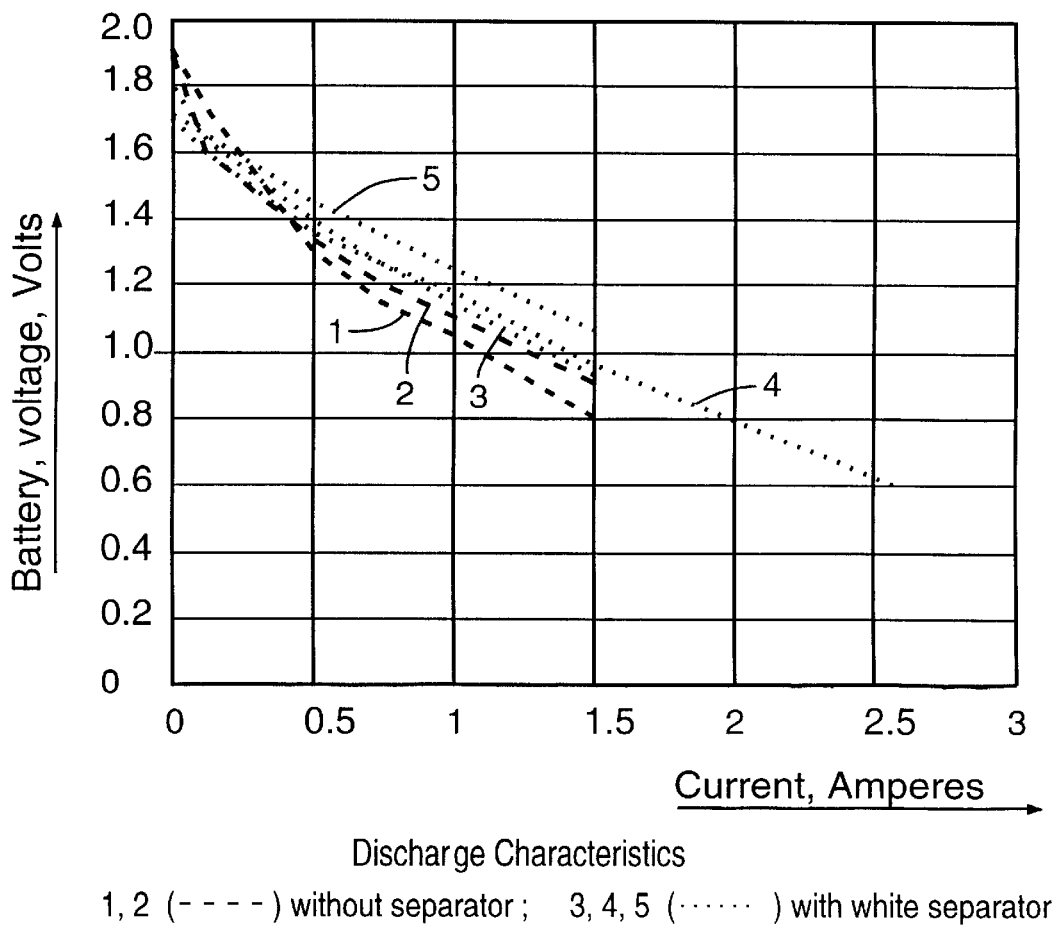
FIG. 16 is a graph showing discharge characteristics of a battery according to the invention.
Figure 17:
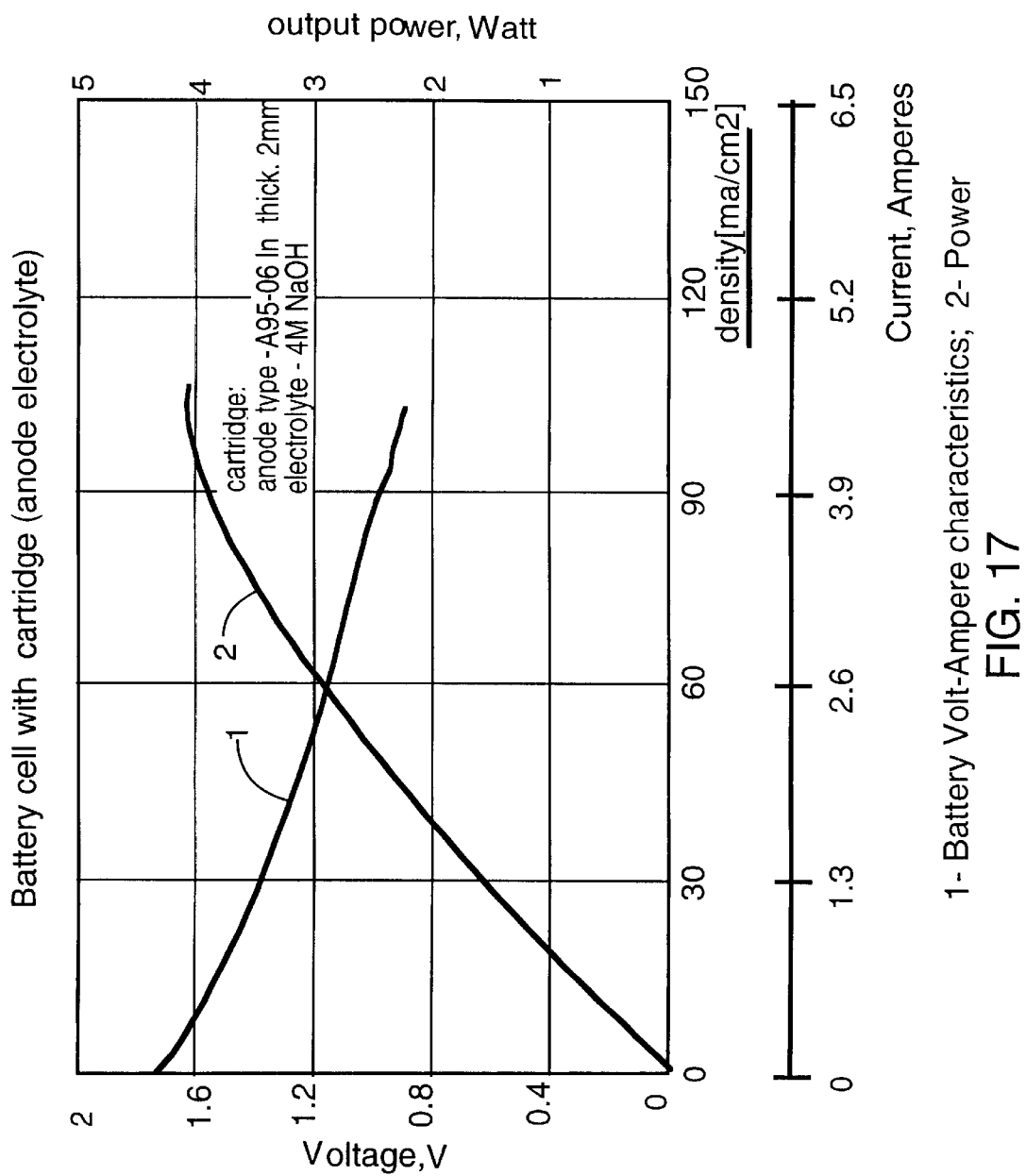
FIG. 17 is a graph showing the current density and power output of a battery according to the invention.

FIG. 16 shows that the cartridge does not have a negative effect on the electrical characteristics of the battery. The curves without separator and with separator are substantially equal, the separator being part of the cartridge.

Figure 18A:
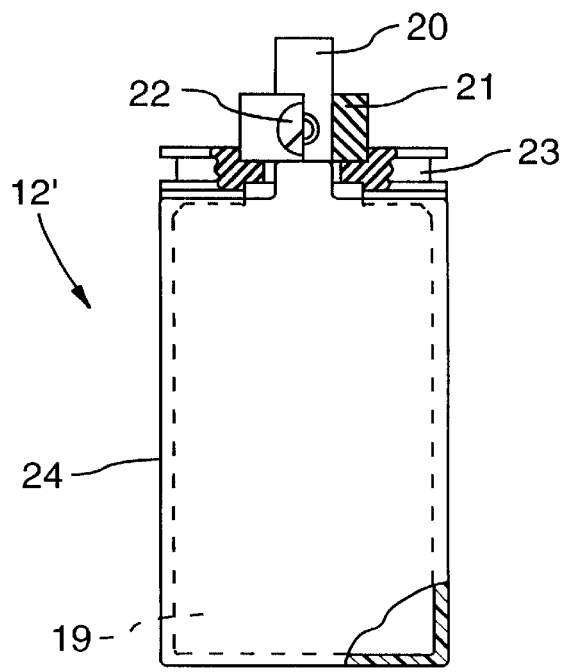
FIG. 18A is a schematic side view of an anode/electrolyte assembly according to a third embodiment of the invention, showing the width of the assembly.
Figure 18B:
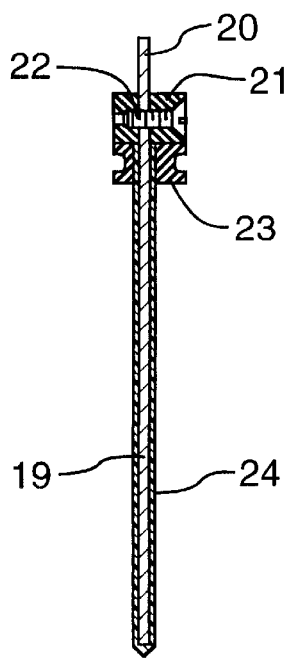
FIG. 18B is a schematic side view of an anode/electrolyte assembly according to a third embodiment of the invention, showing the thickness of the assembly.

In FIGS. 18A and 18B, an embodiment of an anode 12' is shown. The anode comprises a metal plate 19, which has an elongated negative terminal 20 at one end. The negative terminal has a holder 21 fastened to the negative terminal by a fastening means 22. The holder fastens a first sealing means 23 to the anode 12', which first sealing means seals the passage between the anode and the battery housing (not shown) when the anode is inserted into the battery housing. The holder 21 further clamps an anode membrane 24 to the anode, so that the metal plate 19 is covered by the anode membrane. The anode membrane is made of a material which is electrically conducting, ion permeable but impermeable to the results of the chemical reactions taking place in the electrolyte on the anode plate surface. A preferred material is polypropylene. Thus, any reaction products from the anode reactions will be kept inside the anode membrane.

Figure 19A:
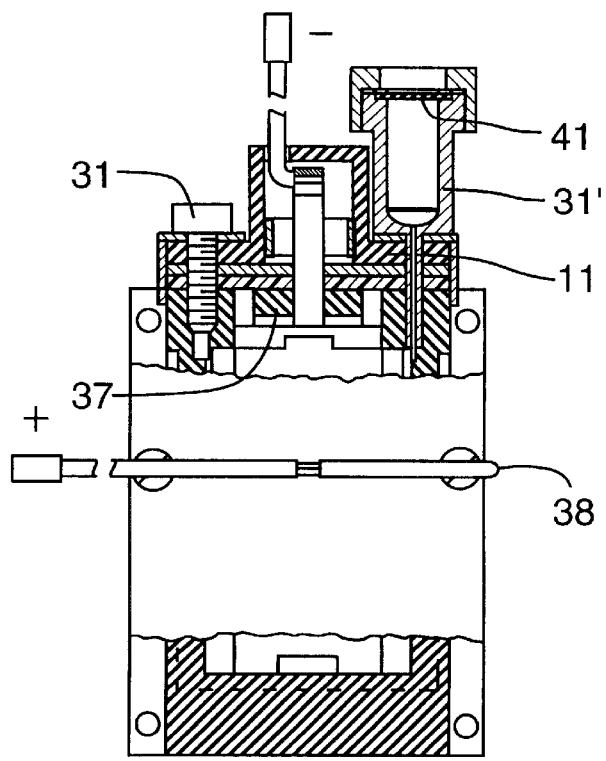
FIG. 19A is a schematic side view of an anode/electrolyte assembly according to a fourth embodiment of the invention, showing the width of the assembly.
Figure 19B:
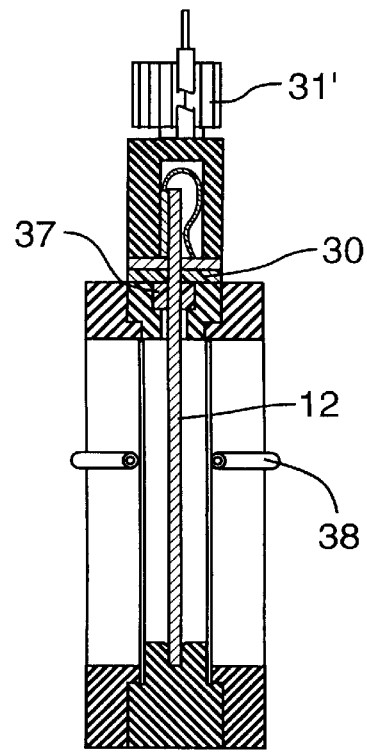
FIG. 19B is a schematic side view of an anode/electrolyte assembly according to a fourth embodiment of the invention, showing the thickness of the assembly.
Figure 19C:
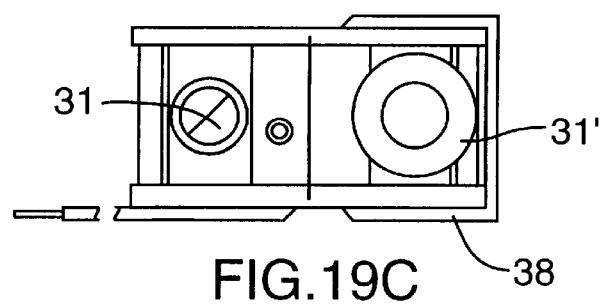
FIG. 19C is a schematic top view of an anode/electrolyte assembly according to a fourth embodiment of the invention.

FIGS. 19A to 19C show a battery body 1 having two cathodes 2, and two tightening straps 36. The cathodes are preferably glued to the body, using a hermetically sealing glue, and are further fixed by the straps. The straps are preferably covered with a hermetically sealing agent. The straps are advantageously held to the body with holding screws (not shown). A jumper 38 electrically connects the two cathodes. The jumper is preferably soldered to the current carrier of the cathodes. A free end of the jumper serves as the positive current output. The anode 2 has a free end serving as the negative current output. A second sealing means 30 is arranged between the anode assembly (the cartridge 200) and the battery body 1, to create a hermetic seal between them when necessary. A fourth sealing means 37 is arranged to further seal around the anode free end. Sealing is accomplished when the cartridge cover 11 is tightened to the battery body using a set screw 31 and a vantage screw 39. The vantage screw has an opening for removing hydrogen from the inner cavity 35, the opening having a liquid impermeable separation membrane 41 preventing any electrolyte from escaping via the vantage screw. The hydrogen is formed by the electrochemical reaction of aluminium corrosion at the anode.

Figure 20A:
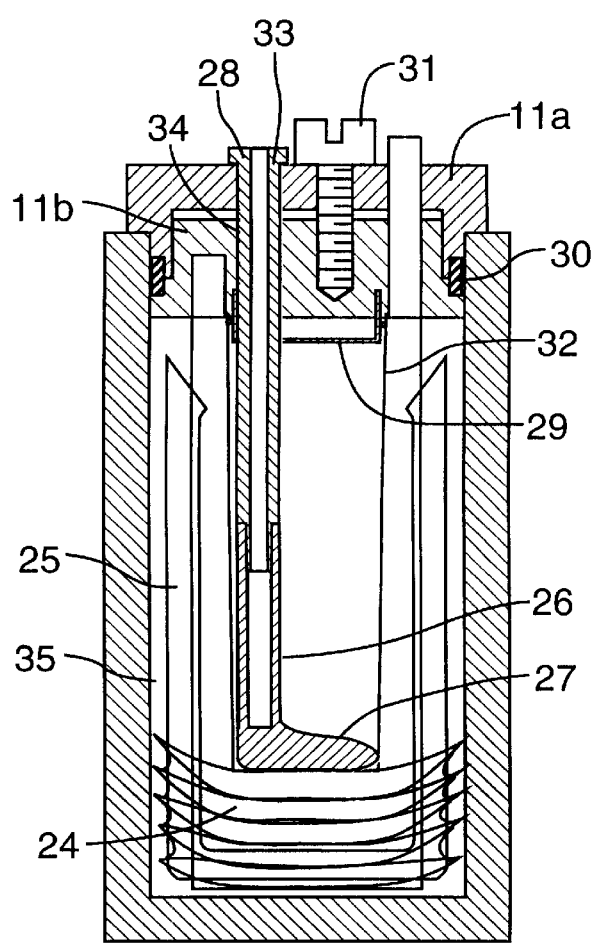
FIG. 20A is a schematic side view of an anode/electrolyte assembly according to a fifth embodiment of the invention, showing the width of the assembly.
Figure 20B:
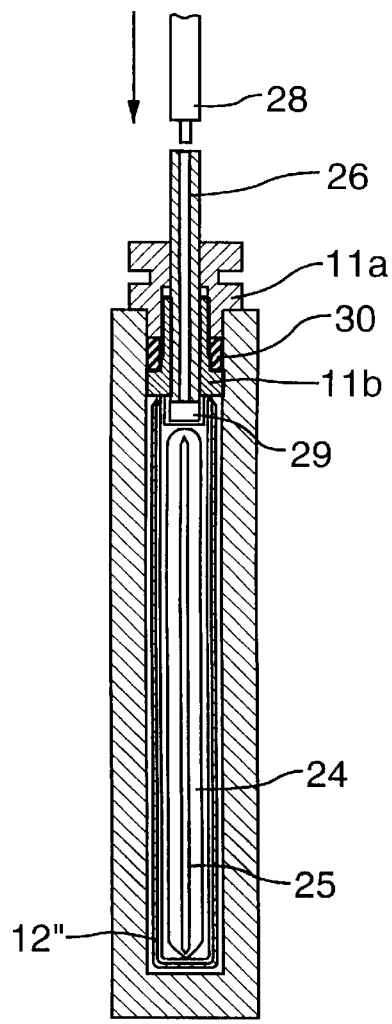
FIG. 20B is a schematic side view of an anode/electrolyte assembly according to a fifth embodiment of the invention, showing the thickness of the assembly.
Figure 21:
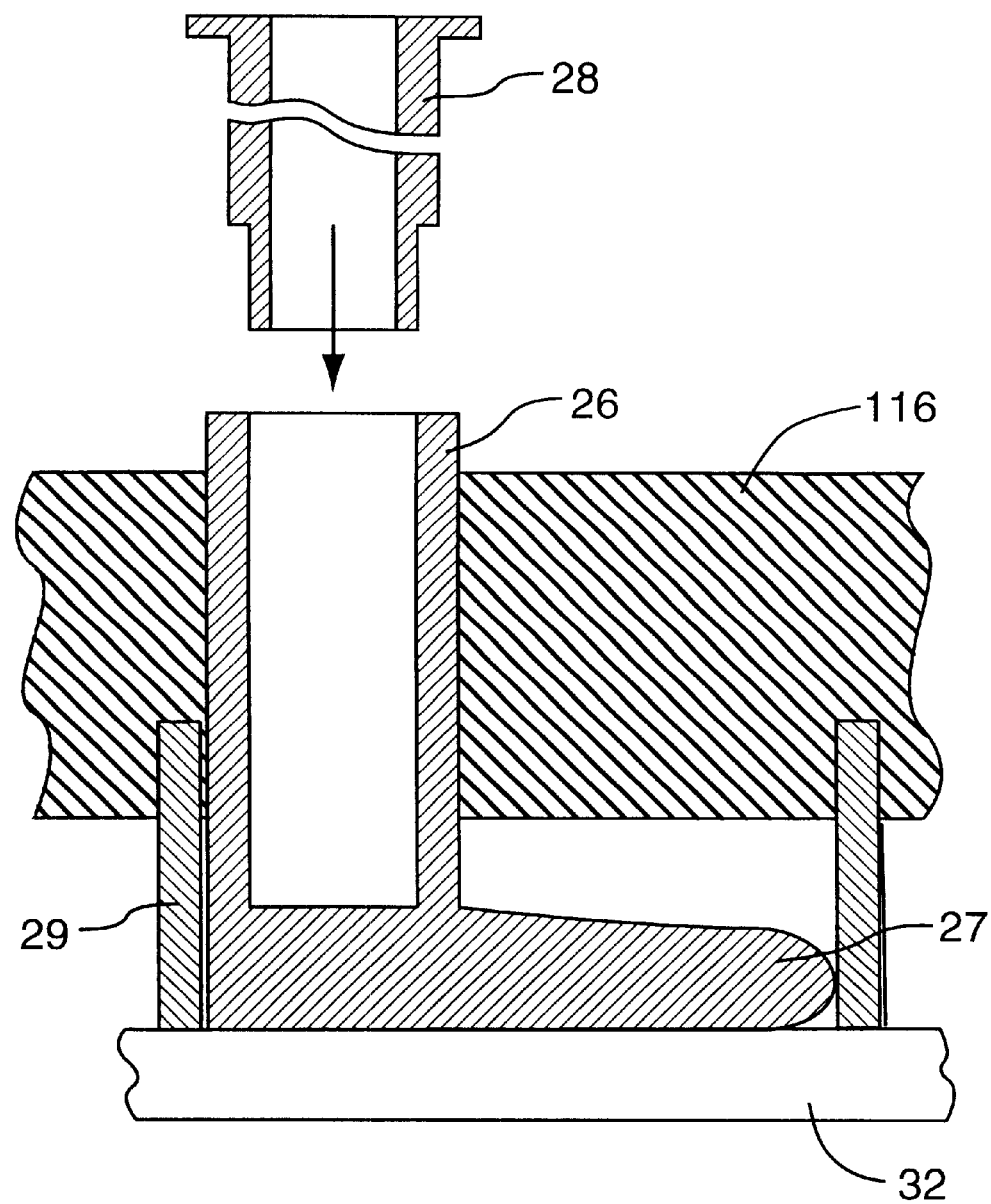
FIG. 21 is a schematic side view of an electrolyte bag depressing assembly according to a FIG. 20A.

In FIGS. 20A, 20B and 21, a further embodiment of a system for activation of the cartridge, after insertion into the cathode assembly, is shown. This embodiment has a two-part cartridge cover comprising an upper cover 11a and a lower cover 11b. The upper cover is screwed to the lower cover by a set screw 31, which engages threads in the lower cover and pushes the upper cover towards the lower cover via pressure from the screw head. Between the two covers is a second sealing means 30, which is expanded when the covers are screwed together, to provide a hermetic seal between the two covers and the battery housing 1. Further, the upper cover 11a has a first push hole 33 and the lower cover 11b has a second push hole 34 for slidingly accommodating a push bar 26. The push bar has a foot end 27, which is larger than the diameter of the push bar, to compress a bag 24 filled with electrolyte when the push bar foot end is moving away from the upper cover and the lower cover. The electrolyte bag 24 is preferably contained in a U-shaped anode 12", held at the lower cover 11b. Inside the electrolyte bag is a puncture element 25, preferably a U-shaped flat piece having sharp points at its ends and running substantially the whole length of an inner cavity 35 of the battery housing. As the foot end 27 of the push bar 26 is pressed onto the electrolyte bag 24, the points of the puncture element 25 will make holes in the bag, thereby allowing electrolyte to flow out into the inside of the battery housing 1 and make contact with both the anode 12" and the cathode (not shown). Preferably, an extension rod 28 is arranged at the end of the push bar 26 which is opposite the foot end 27, to make it possible to press the foot end of the push bar all the way down in order to empty the electrolyte bag. When the cartridge is in its storage state, the push bar foot end is in a position adjacent the lower cover 11b. The end of the push bar 26 which is opposite the foot end 27 protrudes out from the upper cover 11a in the storage state. A third elastic hermetic sealing means 32 is arranged between the foot end 27 and the electrolyte bag 24 and held to the lower cover 11b by a fixture means 29, such as a metal neck. The third elastic hermetic sealing means prevents electrolyte from leaking out from the battery housing 1 via the first push hole 33 and the second push hole 34.

Figure 22C:
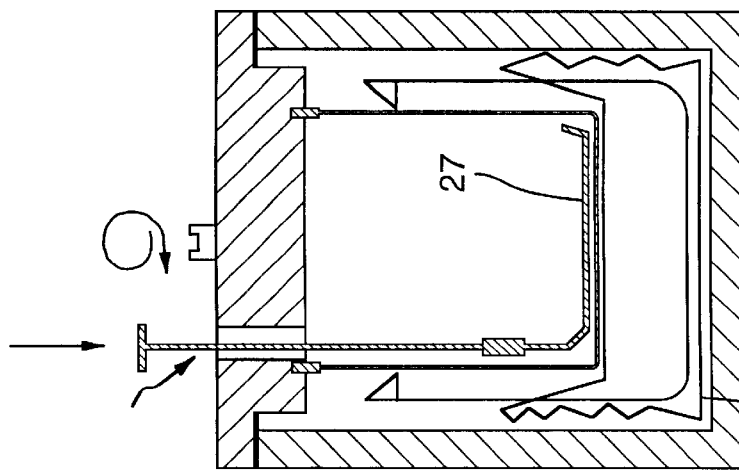
FIG. 22C is a schematic side view of a battery according to FIG. 20A, showing a second intermediate position of the electrolyte bag depressing sequence.
Figure 22B:
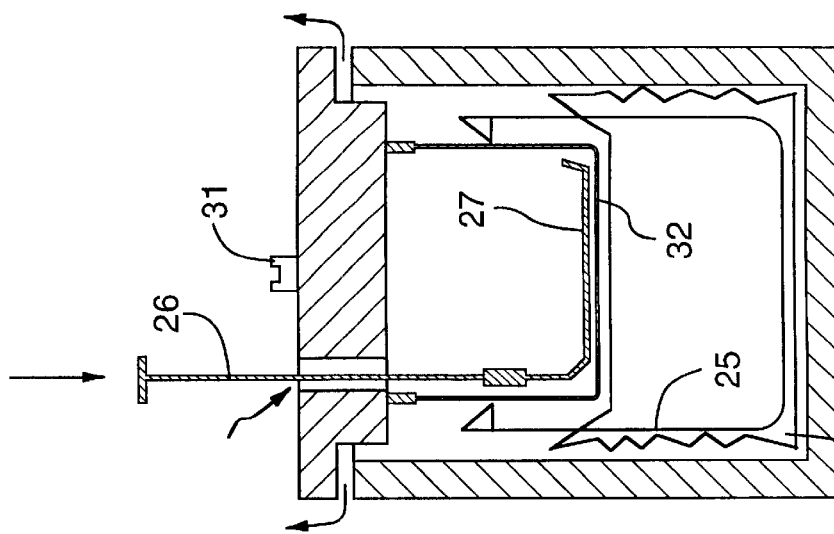
FIG. 22B is a schematic side view of a battery according to FIG. 20A, showing a first intermediate position of the electrolyte bag depressing sequence.
Figure 22A:
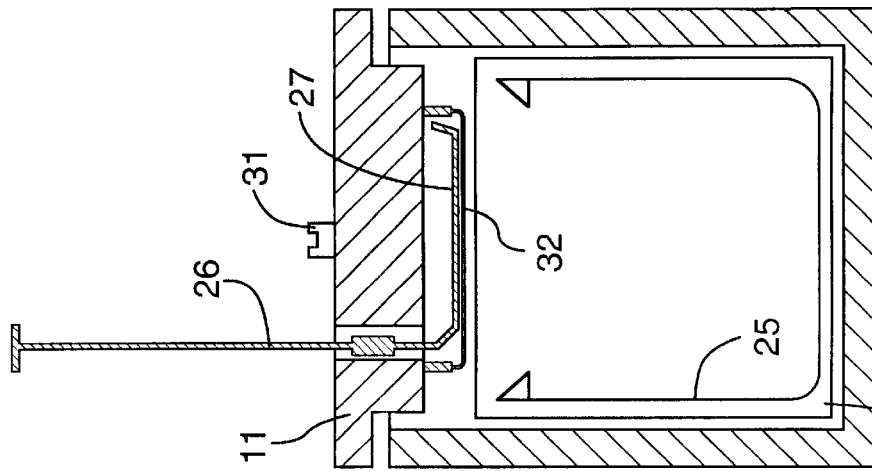
FIG. 22A is a schematic side view of a battery according to FIG. 20A, showing a starting position of the electrolyte bag depressing sequence.
Figure 22E:
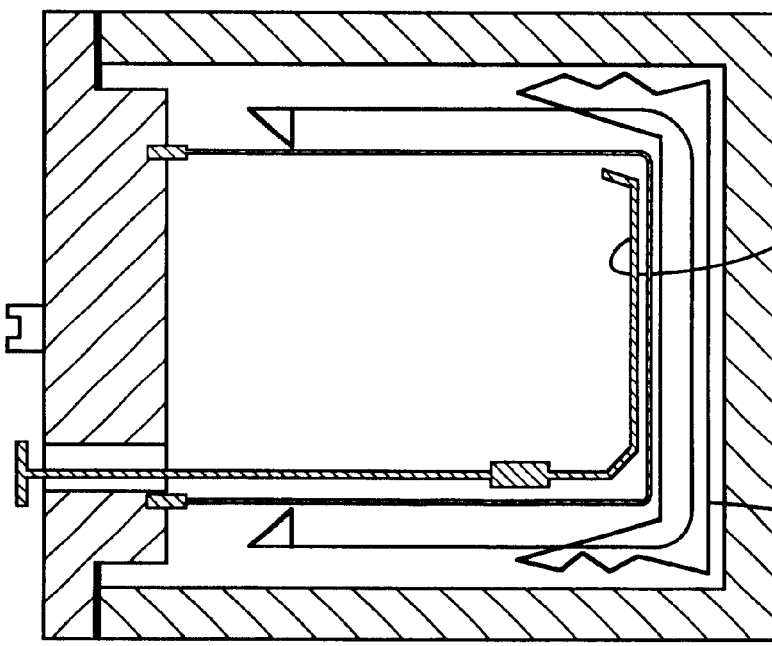
FIG. 22E is a schematic side view of a battery according to FIG. 20A, showing an end position of the electrolyte bag depressing sequence.
Figure 22D:
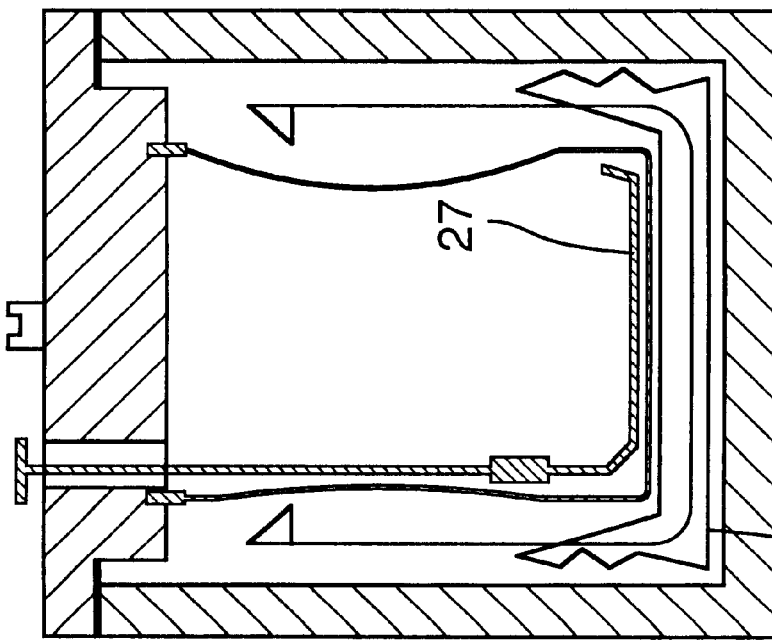
FIG. 22D is a schematic side view of a battery according to FIG. 20A, showing a third intermediate position of the electrolyte bag depressing sequence.

In FIGS. 22A to 22E is shown the sequence of emptying the electrolyte bag 24 inside the inner cavity 35 of the battery housing 1. The battery housing (cathode assembly) is put in a vertical position. Then, the cartridge 200 is fully inserted into the housing, until the lower cover 11b is seated against the battery housing (FIG. 22A). The extension rod 28 is attached to the push bar 26, and the push bar is pressed down into the cartridge (FIG. 22B) until the extension bar 28 has almost reached the top of the upper cover 11a. Thus, when the push bar 26 is pressed into the cartridge, the electrolyte bag is compressed and initially punctured, allowing electrolyte to flow out from the bag. The bag is pressed into an accordion bellows-like shape, whilst the third elastic hermetic sealing means 32 is expanded into the inner cavity 35. The set screw 31 is turned until it cannot be turned further, making the second sealing means 30 seal the gap between the battery housing and the cartridge (FIG. 22C). After this, the battery can be held in any position, without any risk of electrolyte leaking out. The push bar 26 is pressed further down until the foot end 27 stops against the crumpled up, empty electrolyte bag 24 (FIG. 22D). During this stage, the third elastic hermetic sealing means 32, together with the push rod 26, creates an over-pressure in the inner cavity 35, by displacing all existing air from inside the inner cavity. This eliminates any decrease in the level of electrolyte inside the inner cavity. The spent battery is shown in FIG. 22E, where the electrolyte volume has decreased as the anode material is being used up. The cartridge should now be exchanged by unscrewing the set screw 31 until the second sealing means 30 no longer seals the gap between the battery housing and the cartridge.

Figure 23:
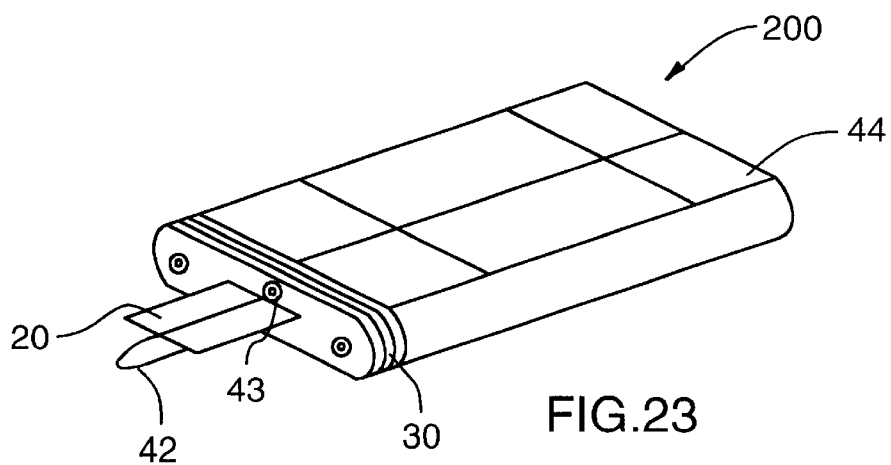
FIG. 23 is a schematic perspective view of a replaceable cartridge according to an embodiment of the invention.
Figures 24A, 24B, 24C:
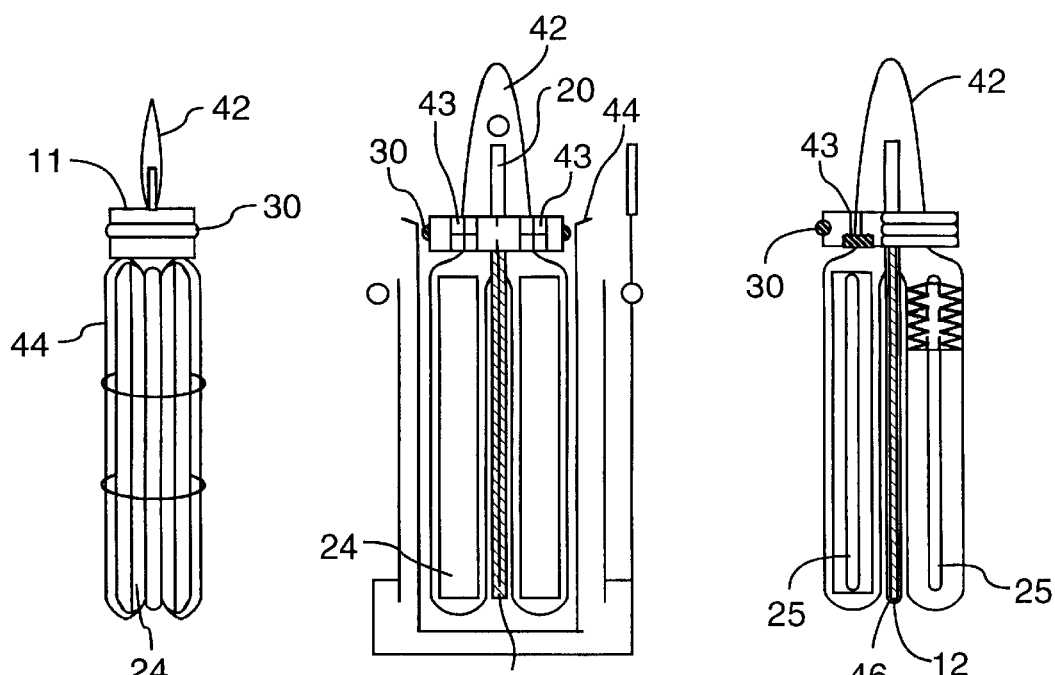
FIG. 24A is a schematic side view of a replaceable cartridge according to FIG. 23, showing the thickness of the cartridge.
FIG. 24B is a schematic side view of a replaceable cartridge according to FIG. 23, showing the width of the cartridge and the electrolyte bags in an initial state.
FIG. 24C is a schematic side view of a replaceable cartridge according to FIG. 23, showing the width of the cartridge and one electrolyte bag in its fully emptied state.

FIGS. 23 to 24C show a replaceable cartridge 200 according to a further embodiment of the invention. The anode 2 has a negative terminal 20 at one end. On each side of the anode is a bag 24 of electrolyte arranged. There are thus two bags, one on each side of the anode. A cartridge cover 11 is holding the negative terminal of the anode, and a second sealing means 30 provides a hermetic seal between the cartridge and the battery body (not shown), when the cartridge is inserted into the battery body. An activation thread 42 is arranged through thread holes 43 in the cover 11. Fifth sealing means 45 are arranged in the thread holes 43, to prevent any electrolyte from leaking out via the thread holes. The activation thread preferably forms a loop outside the cover, and runs through the thread holes into the electrolyte bag compartment of the cartridge, formed by a first protective liquid permeable membrane 44 over both electrolyte bags and the anode. The ends of the activation thread 42 are attached to bottom ends of the electrolyte bags, i.e. the end that is furthest away from the cartridge cover 11. Thus, when a battery operator pulls on the loop of the activation thread 42, the bottom of each electrolyte bag 24 is pulled towards the cartridge cover and against electrolyte bag puncture elements 25 arranged inside the electrolyte bags. The bags are punctured and electrolyte will flow from the bags out into the inner cavity (not shown) of a battery housing and through both the first liquid membrane 44 and a second liquid permeable membrane 46 arranged around the anode 2. This operation should only be performed when the cartridge is sealingly seated in a battery housing (cathode assembly). The second liquid permeable membrane 46 will not let any reaction products from the anode reaction through, thereby effectively containing these by-products until the cartridge is replaced with a fresh one.

Figure 25A:
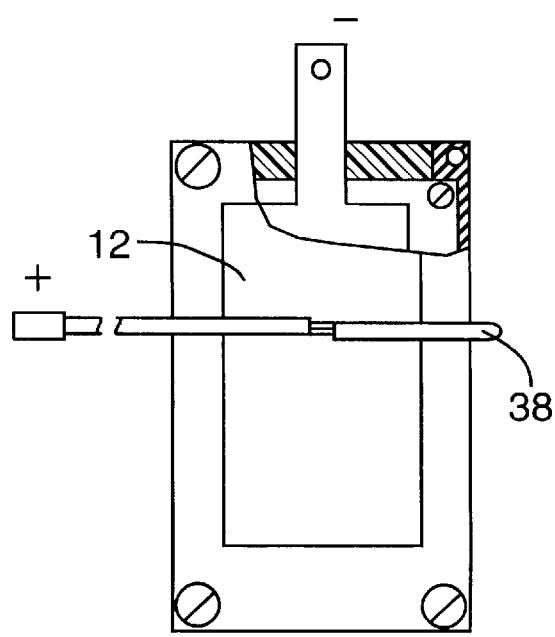
FIG. 25A is a schematic side view of a replaceable cartridge battery according to the invention, showing the width of the cartridge.
Figure 25B:
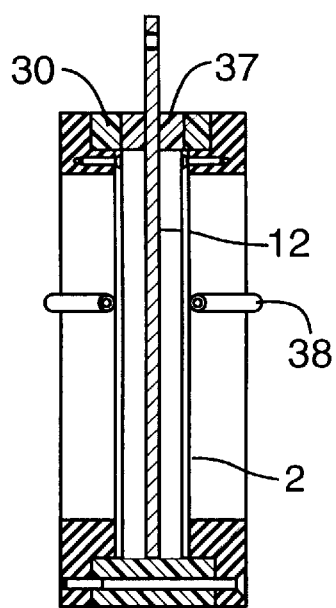
FIG. 25B is a schematic side view of a replaceable cartridge battery according to the invention, showing the thickness of the cartridge.

FIGS. 25A and 25B show yet a further embodiment of a battery according to the invention. A battery body 1 has two cathodes 2, and a cartridge 200. The cartridge has a cover 11 with a sealing means arranged around a negative terminal end 20 of an anode 12. The cathodes are preferably screwed to the body, using a hermetically sealing agent to seal any leaks in the screw holes. A jumper 38 electrically connects the two cathodes. The jumper is preferably soldered to the current carrier of the cathodes. A free end of the jumper serves as the positive current output. The anode 12 has a free end serving as the negative current output (negative terminal) 20. A second sealing means 30 is arranged between the anode assembly (the cartridge 200) and the battery body 1, to create a hermetic seal between them when necessary. A fourth sealing means 37 is arranged to further seal around the anode free end. Sealing is accomplished when the cartridge cover 11, together with the anode 12, is fully pressed into the inner cavity 35 of the battery body 1, via the second sealing means 30.

Figure 26A:
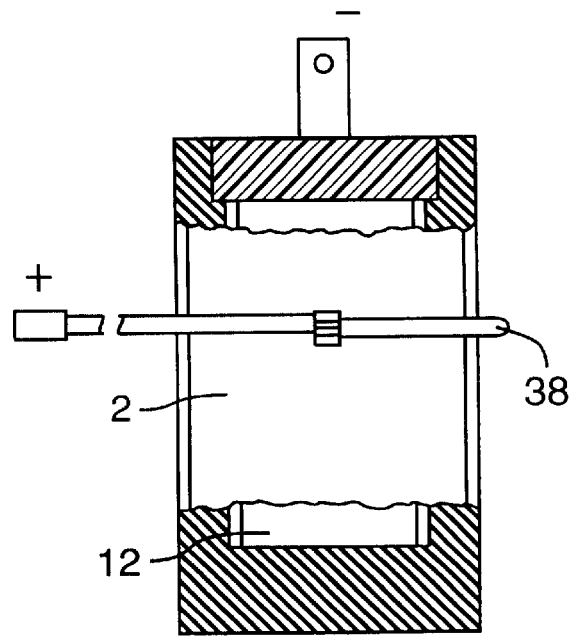
FIG. 26A is a schematic side view of a replaceable cartridge battery according to the invention, showing the width of the cartridge.
Figure 26B:
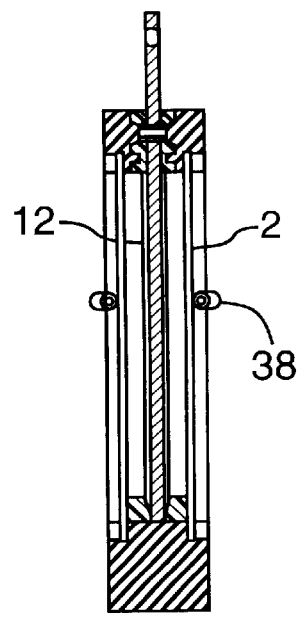
FIG. 26B is a schematic side view of a replaceable cartridge battery according to the invention, showing the thickness of the cartridge.
Figure 27:
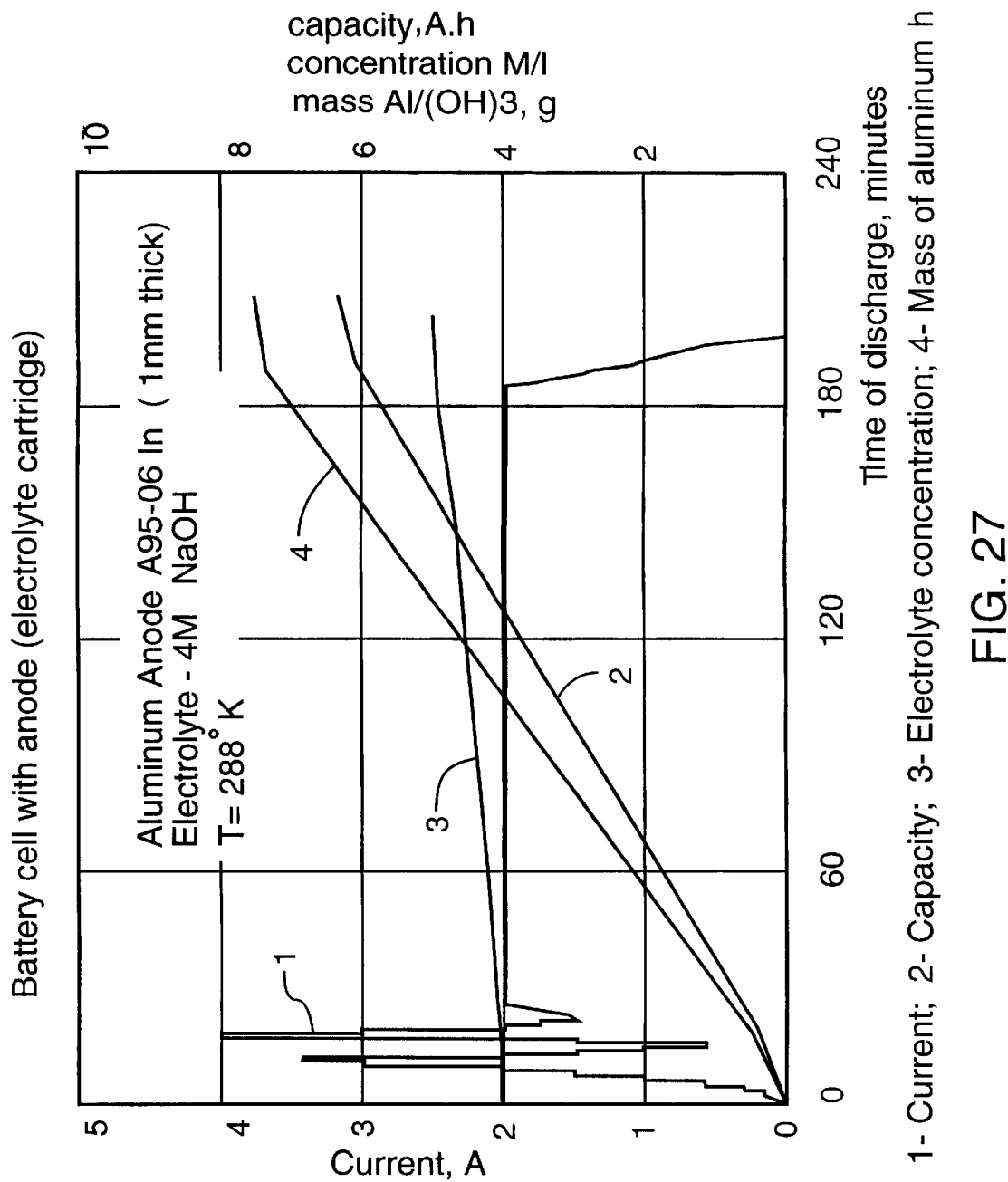
FIG. 27 is a diagram showing the discharge characteristics of a battery according to the invention.

FIGS. 26A and 26B show still a further embodiment of a battery according to the invention. A battery body I has two cathodes 2, and a cartridge 200. The cartridge has a cover 11 with a sealing means arranged around a negative terminal end 20 of an anode 12. The cathodes are preferably screwed to the body, using a hermetically sealing agent to seal any leaks in the screw holes. A jumper 38 electrically connects the two cathodes. The jumper is preferably soldered to the current carrier of the cathodes. A free end of the jumper serves as the positive current output. The anode 12 has a free end serving as the negative current output (negative terminal) 20. A second sealing means 30 is arranged between the anode assembly (the cartridge 200) and the battery body 1, to create a hermetic seal between them when necessary. A fourth sealing means 37 is arranged to further seal around the anode free end. Sealing is accomplished when the cartridge cover 11, together with the anode 12, is fully pressed into the inner cavity 35 of the battery body 1, via the second sealing means 30.

The cathode is preferably a gas diffusion, multi-layered electrode (that can be provided in disc, coil, flat, cylindrical, or other form), containing a conducting mesh and gas-permeable and gas impermeable layers, the structure and technology of which assures the required electrical characteristics and necessary resource. The cathode may also incorporate additives, in quantities up to 200 mg/cm$^2$ of cathode area, such as lead oxides ($PbO$—$PbO_2$ up to 99% $PbO_2$) and/or alloys of silver and indium (comprising up to 99% silver) to improve the cathode performance.

CHART 1

| Additives designation | $A_a$ | $B_a$ | $C_a$ | $D_a$ | $E_a$ | $F_a$ | $G_a$ | $H_a$ |
|---|---|---|---|---|---|---|---|---|
| Additives compostion | Ga | In | Tl | Sn | Cd | Pb | Mn | Fe |
| Additives quantities | 0–5 mass % | 0–5 mass % | 0–5 mass % | 0–5 mass % | 0–5 mass % | 0–5 mass % | 0–5 mass % | 0–5 mass % |

Figure 4:
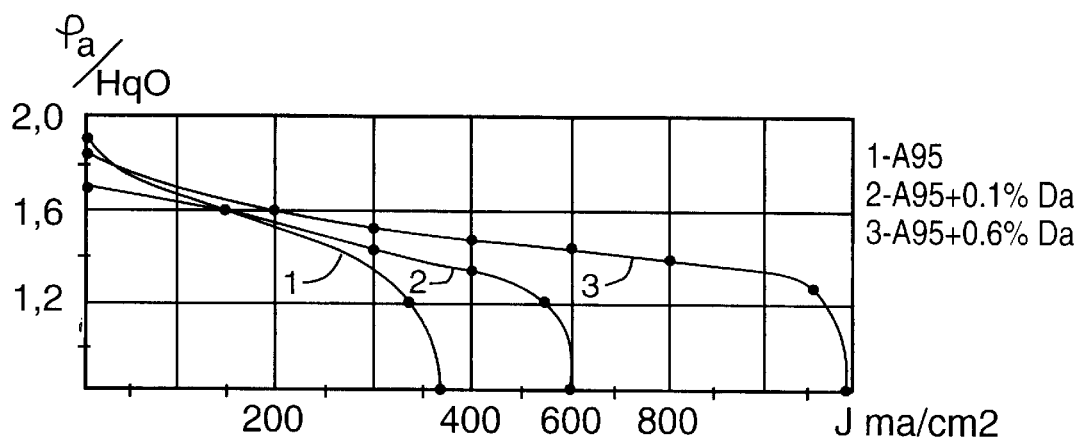
FIG. 4 is a graph showing the relative anode potential vs the current density and amount of additive $D_a$ in the anode composition.
Figure 5:
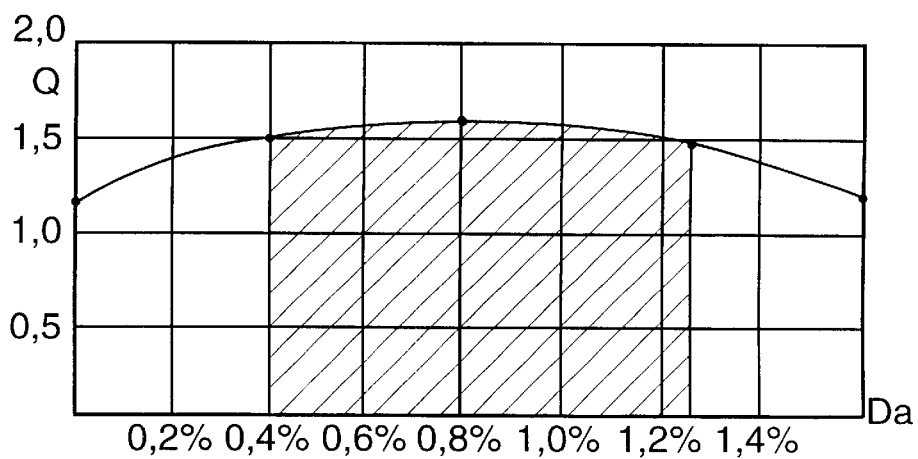
FIG. 5 is a graph showing the load density vs the amount of additive $D_a$ in the anode composition.

The anode is preferably made from a metal, preferably Al, Zn, Mg, or their alloys, with one or more of the additives $A_a$ (Ga), $B_a$ (In), $C_a$ (Tl), $D_a$ (Sn), $E_a$ (Cd), $F_a$ (Pb), $G_a$ (Mn), and $H_a$ (Fe) to improve the electrochemical characteristics of the battery and lower self-discharge (FIG. 4 and FIG. 5). The anode thickness is preferably selected in the range of 0.05 mm to 10 mm, so that the anode and the electrolyte are used up at the same time.

The electrolyte is preferably made of a thickening composition of salts and alkali with additives $A_e$ (a $Sn^{+4}$ compound), $B_e$ (a $Pb^{+4}$ compound), $C_e$ (a $Ga^{+3}$ compound), $D_e$ (an $In^{+3}$ compound), $E_e$ (a polysaccharide based on D-glucose), $F_e$ (polyesters including amides), $G_e$ (2–3 carbon alcohols), $H_e$ (halides or hydroxides of alkaline metals) in order to increase the electrical load, the electrical capacitance, electrical conductance, freeze-stability and assurance of the required potential.

CHART 2

| Additives designation | $A_e$ | $B_e$ | $C_e$ | $D_e$ | $E_e$ | $F_e$ | $G_e$ | $H_e$ |
|---|---|---|---|---|---|---|---|---|
| Additives compostion | $Sn^{+4}$ | $Pb^{+4}$ | $Ga^{+3}$ | $In^{+3}$ | Polysaccharide based on D-glucose | Polyesters incl. Amides composition | 2–3 C alcohols | Halogenide and Hydroxide of alkaline metals |
| Additives quantities | 0–1 mol/l | 0–1 mol/l | 0–1 mol/l | 0–1 mol/l | 0–15% mass % | 0–5 mass % | 0–15 mass % | 0–1 mol/l |

It is known that, when using solutions of salt as an electrolyte, for example NaCl, in air-aluminum batteries, the reaction product forms a gel. For the present invention, however, which utilizes a cartridge, it is desirable to maintain the reaction products in a crystalline form. As reflected in the experimental data provided in Table 2, the use of additives $B_e$ and $H_e$ allowed the inventors to achieve this desired result.

EXAMPLE 1

Figure 3:
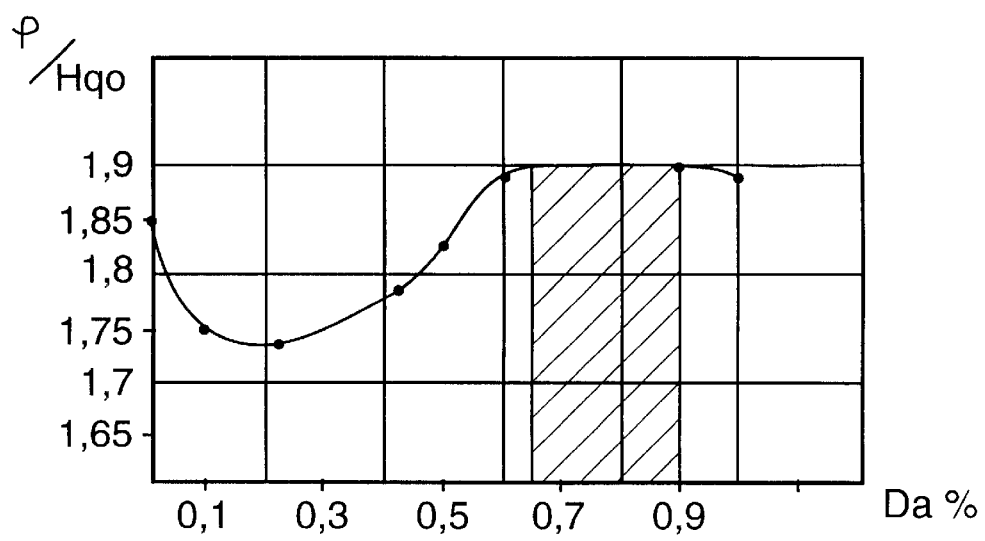
FIG. 3 is a graph showing the relative anode potential vs the amount of additive $D_a$ in the anode composition.
Figure 6:
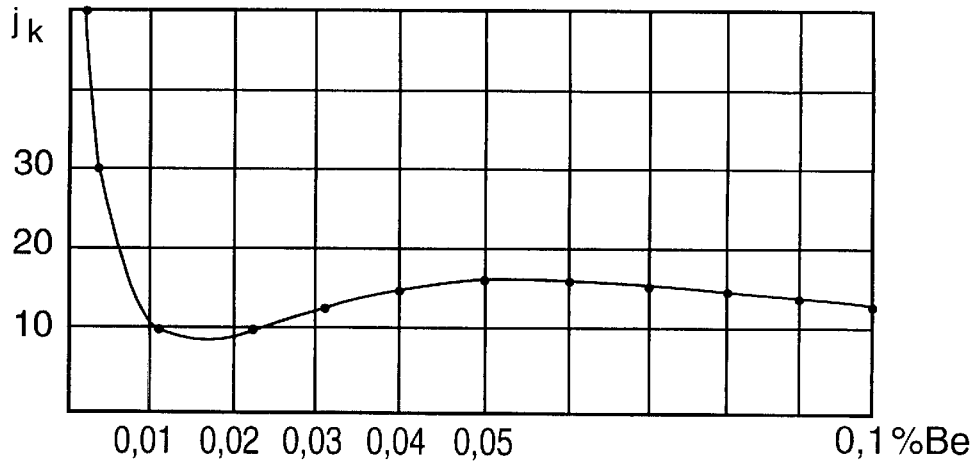
FIG. 6 is a graph showing the density of the corrosion current of the anode vs the amount of additive $B_e$ in the electrolyte composition.

Two electrolytes were prepared, the first comprising an aqueous solution of NaCl and the second comprising an aqueous solution of NaCl with additive $E_e$. These electrolytes were poured into air-aluminum batteries comprising an anode with additive $A_a$ and a gas diffusion cathode. The batteries were then discharged at current density (j) of 400A/m² for eight hours. Comparison of experimental results show that in both cases when $B_e$ and $H_e$ were used as additives and a gel was absent. The effectiveness of the power sources thereupon is conserved, the voltage in the elements is increased by 0.3–0.5 V (FIG. 3) and the corrosion rate of the anode is the same or less (FIG. 6). These results demonstrate that a battery according to the present invention has improved energy, working characteristics, and an improved anode depletion coefficient.

Experimental results obtained from embodiments of the proposed air-aluminum battery are shown in Tables 1 and 2. As is seen from these tables, the proposed source is providing both high performance and stability in means of electro-energetic characteristics. The use of the proposed complex of additives allows us to obtain new qualities for the battery and achieve the unprecedented characteristics.

Figure 12:
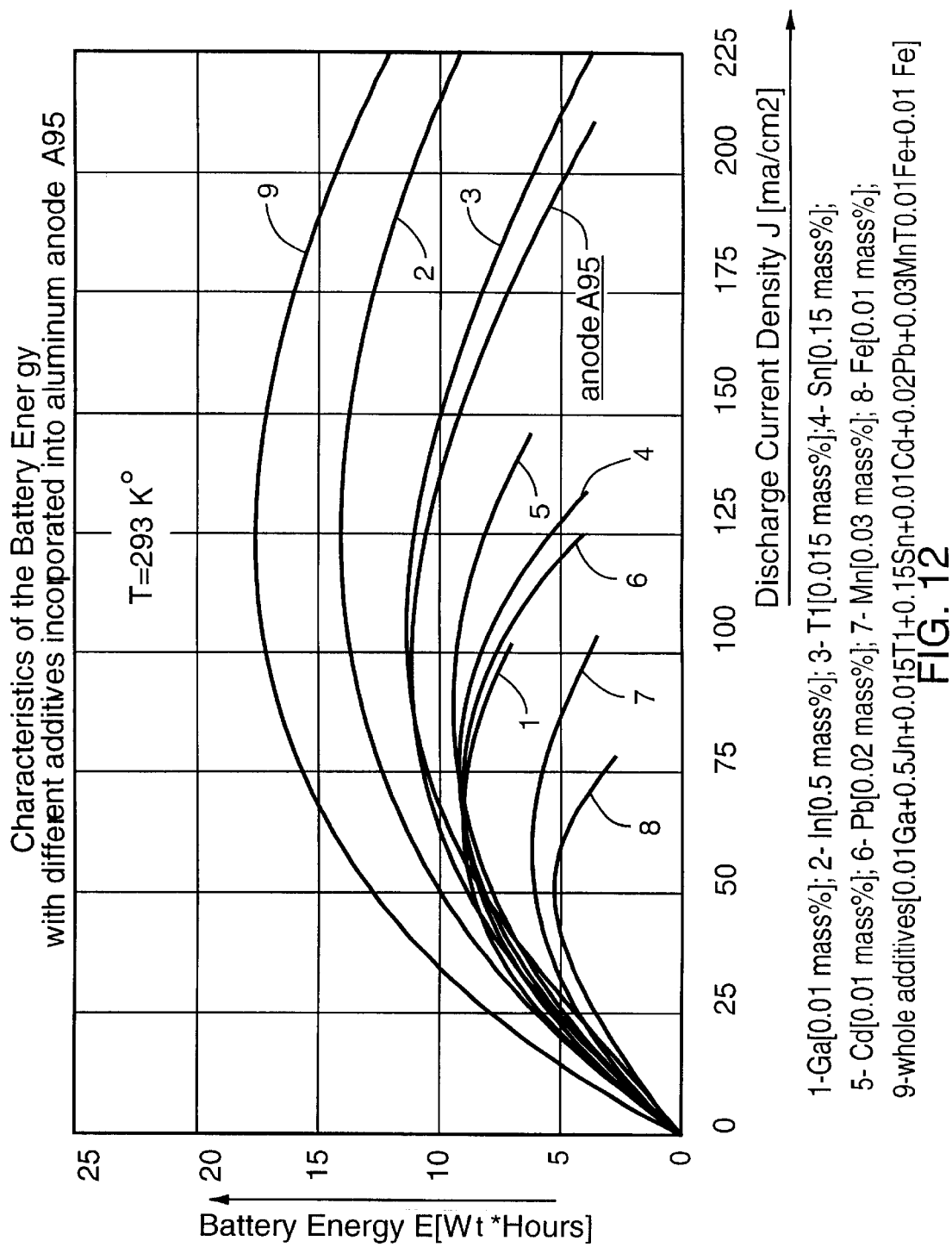
FIG. 12 is a graph showing the battery energy vs the discharge current density for different types of anode compositions.
Figure 14:
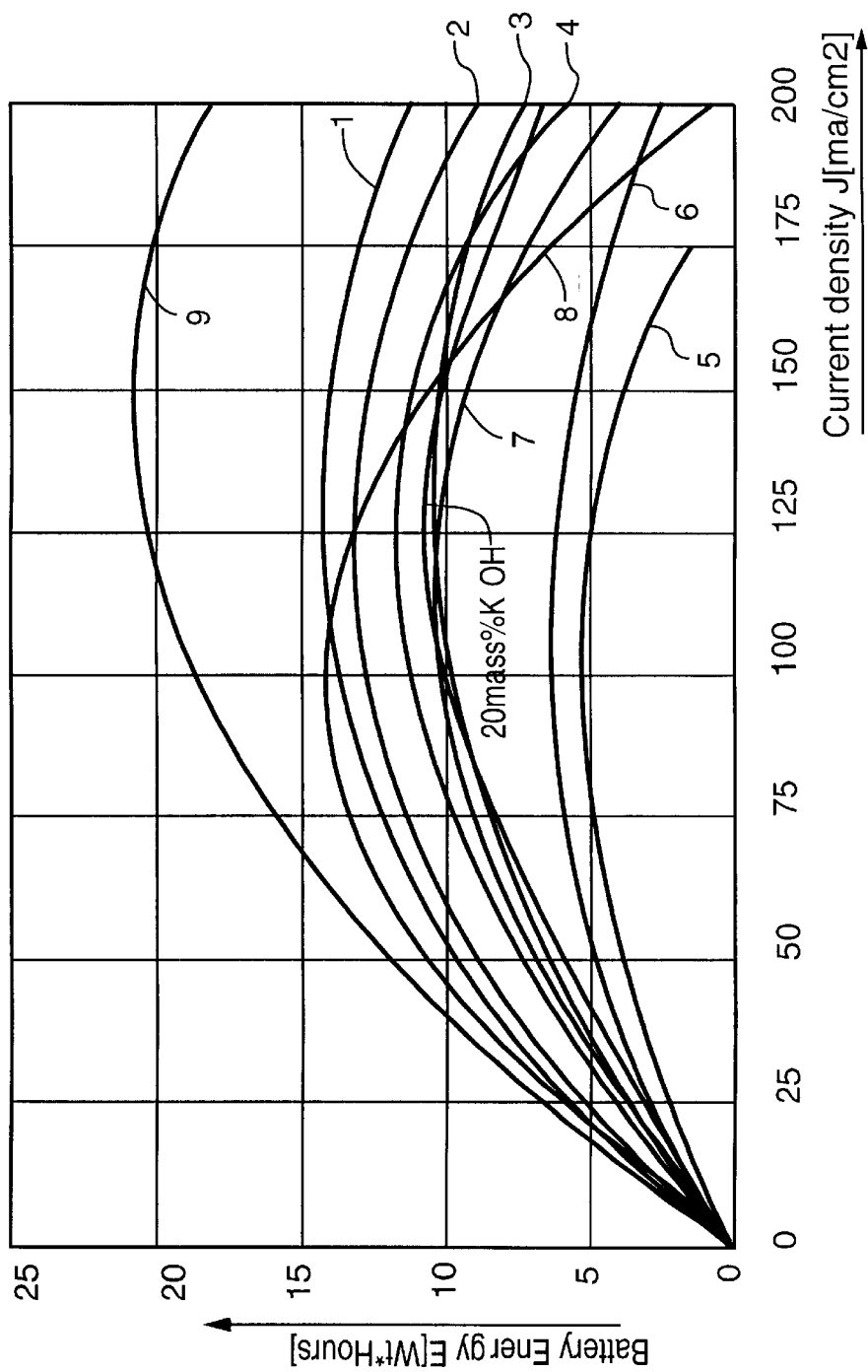
FIG. 14 is a graph showing the battery energy vs the discharge current density for different types of electrolyte compositions.

Tables 1 and 2 and FIGS. 3 to 6 show the effect from the use of these additives. For instance, the use of the additive Da, in quantity for up to 0.8 mass %, will increase the battery energy capacity up to 1.4 times. The use of the additive Be (FIG. 6), in quantity 0.01–0.1 mass %, will decrease in more than 10 times the speed of parasitic reaction of anode corrosion in the above mentioned battery. The individual use of each additive separately will improve just one of the selective parameters. While the complex use of proposed additives will improve the overall characteristics of the battery. Our specific research related to battery for radio-electronic devices showed that the selective use of individual additives allows to achieve high volt-ampere, power, and efficiency characteristics during the initial period of battery use. However, they don't remain constant during the whole period of battery use. The combined use of the complexes of incorporated additives, allows us to keep the optimal characteristics constant during the whole period of battery use. FIG. 12 illustrates the battery discharge characteristics with anode and electrolyte, using a combined complex of the proposed additives. Without the use of additives, these characteristics cannot be achieved.

The additives used as catalyst:

Curve 1—without additives

Curve 2—additive Ag (5 mg/cm²);

Curve 3—additives Pt-Pd (0.5 mg/cm²):

Curve 4—additive Pb (10 mg/cm²)

Figure 15:
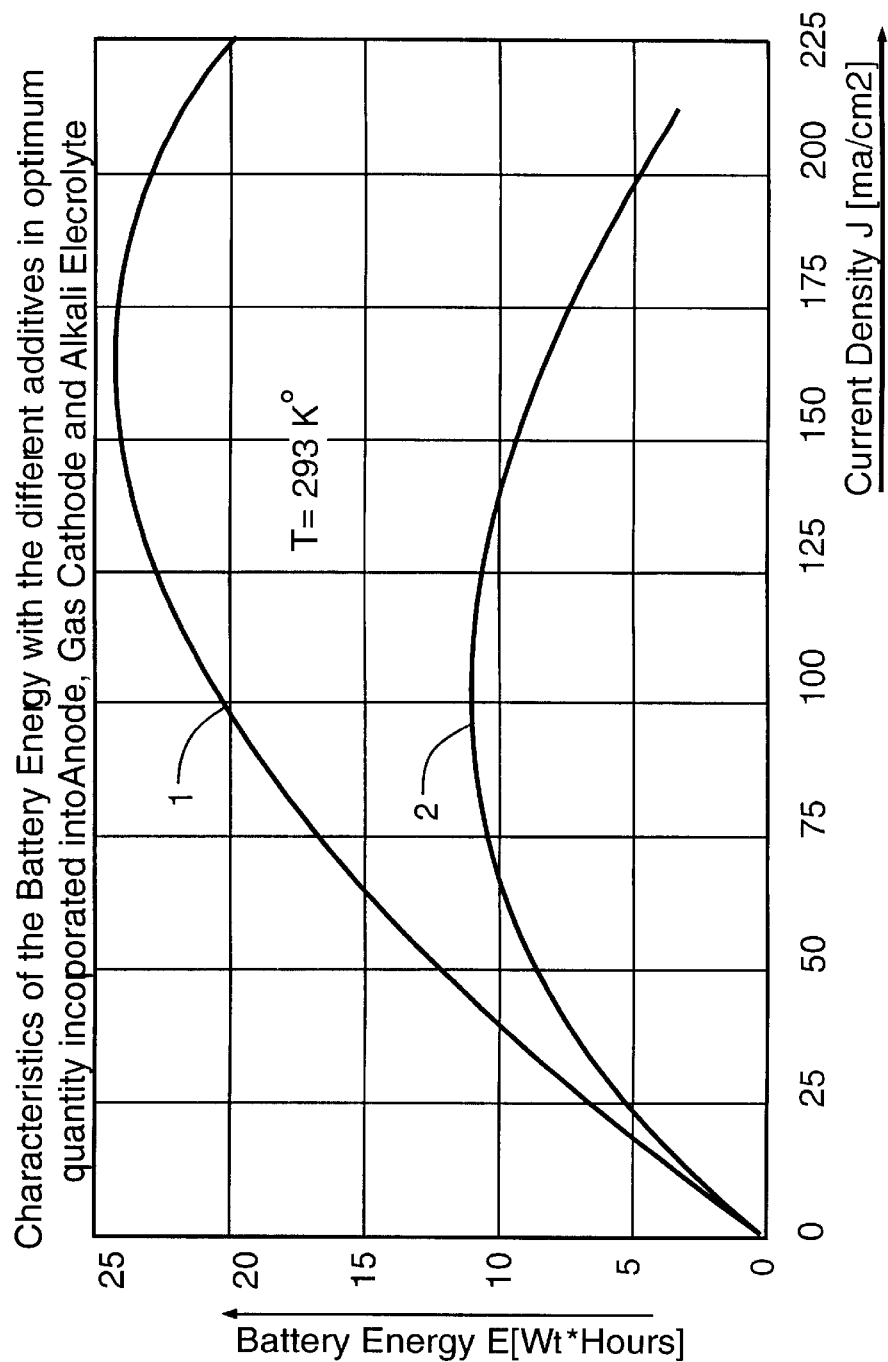
FIG. 15 is a graph showing the battery energy vs the current characteristics for a basic embodiment of the invention and an optimum embodiment of the invention.

The optimum use of combined complex of additives in anode, electrolyte, and cathode allows us to significantly increase the energetic capacity of the battery (FIG. 15). The electric capacity of the battery increases in more than two times at the medium and high density of current (more than 100 mA/cm², temperature —293 K).

Figure 9:
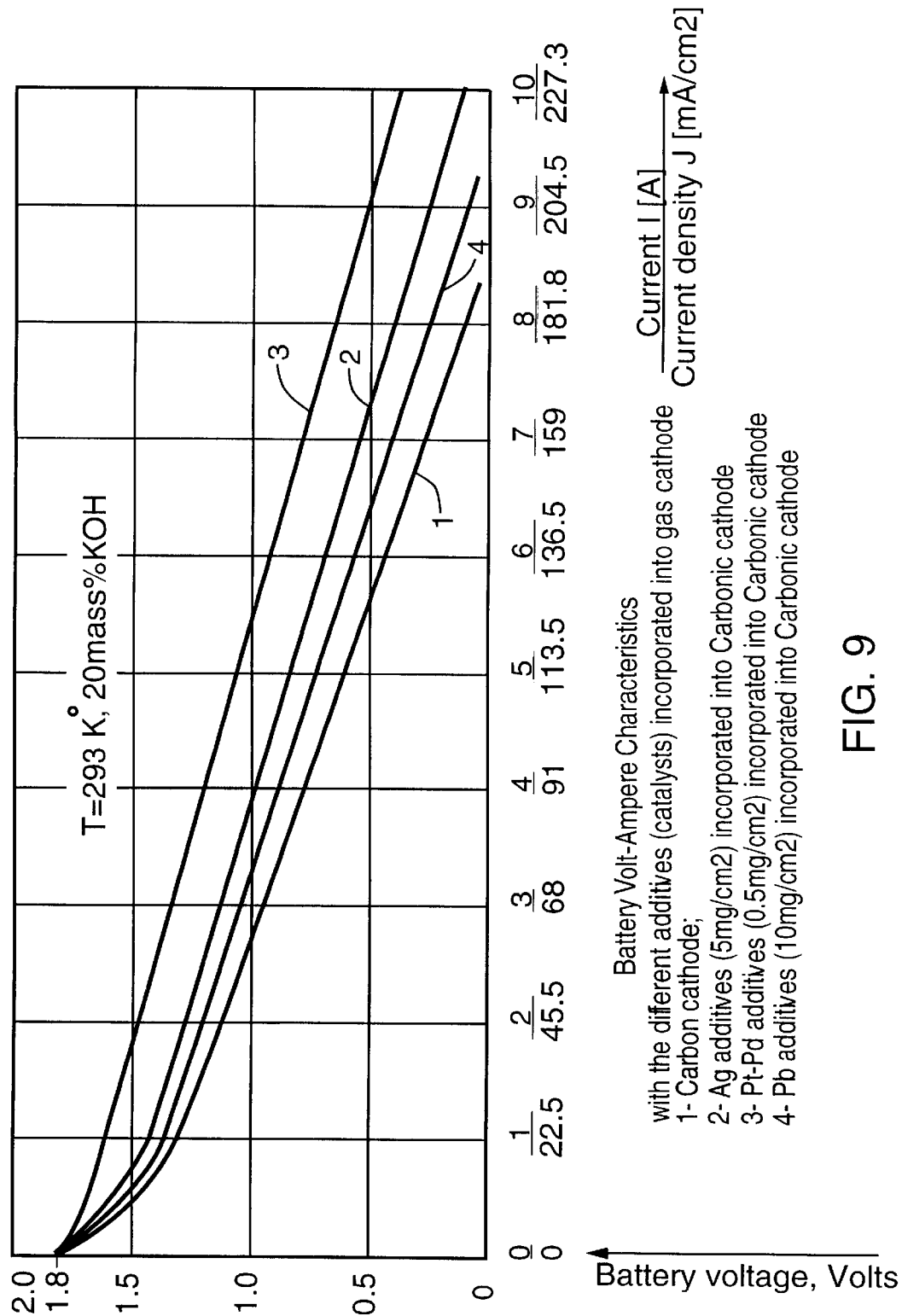
FIG. 9 is a graph showing the battery voltage vs the current characteristics for different types of cathode compositions.
Figure 10:
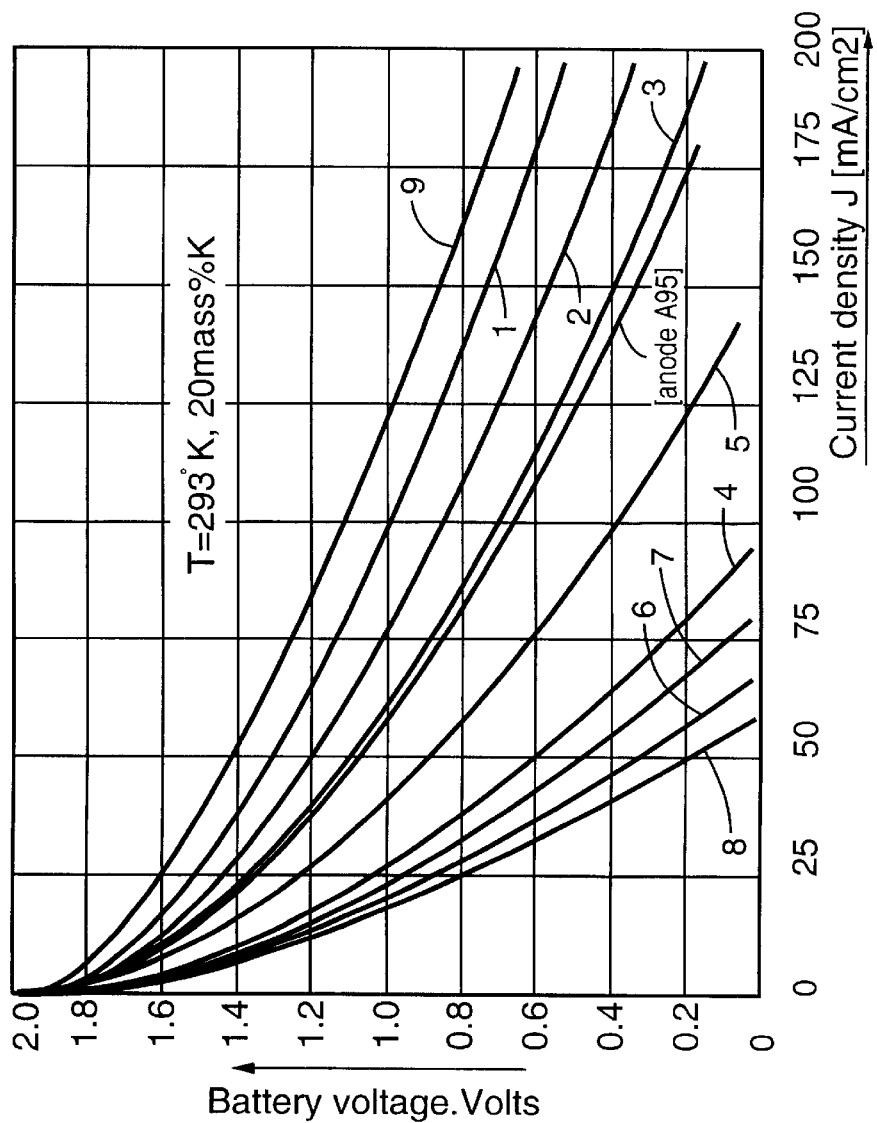
FIG. 10 is a graph showing the battery voltage vs the current characteristics for different types of anode compositions.
Figure 11:
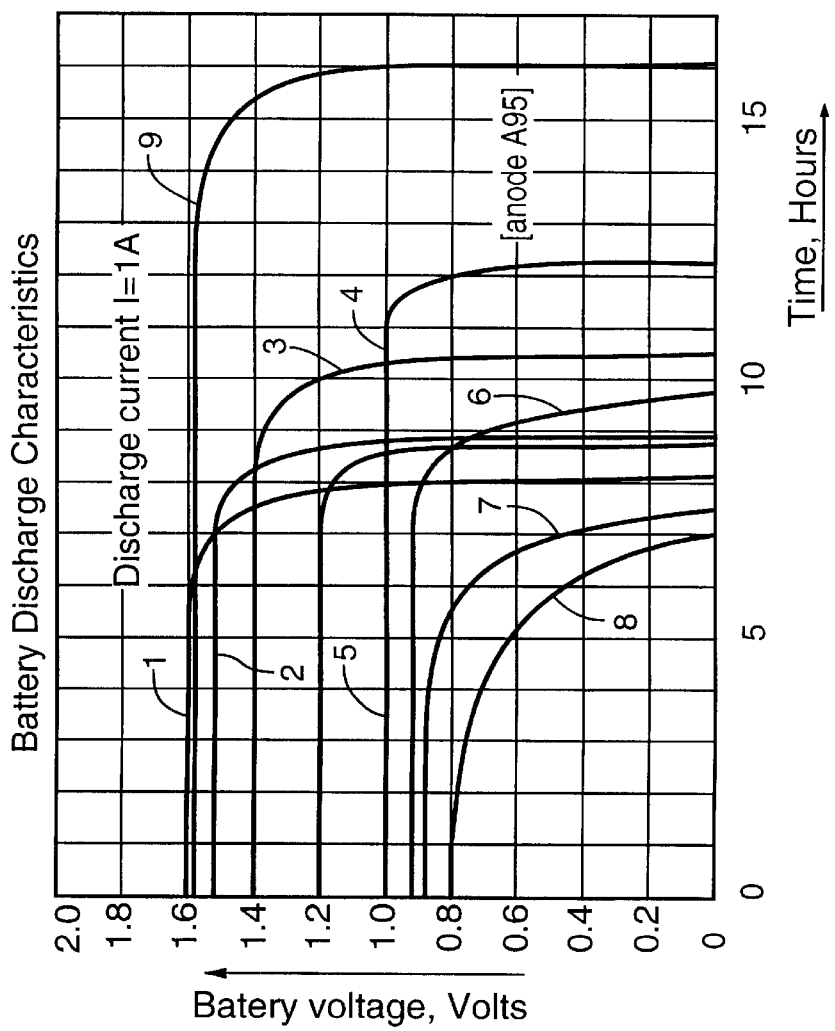
FIG. 11 is a graph showing the battery discharge characteristics for different types of anode compositions.

FIG. 9 illustrates experimental volt-ampere characteristics of the battery with the use of gas-diffusion electrodes with hydro-phobic, catalytic, and hydro-philous layers, and current collector of metallic mesh.

TABLE 1

Electrolytic Characteristics of An Air-Aluminum Battery with Alkali Electrolyte

| Electrolyte Volume | V = 32 ml |
|---|---|
| Cross section | S = 22.1 cm² |
| Specific capacitance | $Q_{ym}$ = 0.159 A-hr/ml–0.138 A-hr/gr |
| Temperature | T° = 293 K.° |
| Current density | I |
| Anode potential | $F_{ia}$ |
| Cathode potential | $F_{ik}$ |
| Battery voltage | V |
| Time of experiment | t |
| Experiment number | N |

| N ... | I mA/cm² | Fia V | Fik V | V V | t Minutes |
|---|---|---|---|---|---|
| 1 | 0 | −1.775 | 0.010 | 1.765 | 0 |
| 2 | 3.16 | −1.601 | −0.155 | 1.446 | 0 |
| 3 | — | −1.637 | −0.179 | 1.458 | 5 |
| 4 | — | −1.653 | −0.177 | 1.476 | 10 |
| 5 | — | −1.656 | −0.178 | 1.478 | 15 |
| 6 | — | −1.665 | −0.176 | 1.489 | 65 |
| 7 | — | −1.667 | −0.176 | 1.491 | 75 |
| 8 | 45.24 | −1.328 | −0.319 | 1.009 | 75 |
| 9 | — | −1.279 | −0.319 | 0.960 | 80 |
| 10 | — | −1.240 | −0.319 | 0.921 | 85 |
| 11 | — | −1.205 | −0.315 | 0.890 | 90 |
| 12 | — | −1.202 | −0.294 | 0.908 | 135 |
| 13 | — | −1.209 | −0.317 | 0.898 | 150 |
| 14 | — | −1.219 | −0.321 | 0.989 | 165 |
| 15 | — | −1.180 | −0.321 | 0.859 | 195 |
| 16 | — | −1.192 | −0.323 | 0.869 | 215 |
| 17 | — | −1.184 | −0.320 | 0.864 | 225 |
| 18 | — | −1.175 | −0.321 | 0.854 | 155 |
| 19 | — | −1.172 | −0.344 | 0.828 | 285 |
| 20 | — | −1.078 | −0.286 | 0.792 | 325 |
| 21 | — | −1.144 | −0.263 | 0.881 | 335 |
| 22 | — | −1.129 | −0.272 | 0.857 | 345 |
| 23 | — | −1.079 | −0.289 | 0.799 | 355 |
| 24 | — | −0.824 | −0.270 | 0.554 | 365 |
| 25 | — | −0.966 | −0.258 | 0.702 | 375 |

TABLE 2

Electrolyte: 4M aqueous salt solution
Anode: aluminum alloy with a base additive $D_a$(Sn)
Discharge Current Density: 452.56 A/m²

| N | Additive % | Temp °C. | Resistance c 1/(Ω * m) | J Corrosion A/m² | Ya Volts | Yk Volts | Appearance of the sludge |
|---|---|---|---|---|---|---|---|
| 1 | 0 | −16 | 19.57 | 110 | 1.128 | 0.385 | Sticky, difficult gel |
| 2 | 10% $B_e$ | −20 | 20.0 | 75 | 1.240 | 0.321 | Powdery, precipitate |
| 3 | 20% $B_e$ | −25 | 20.5 | 35 | 1.409 | 0.306 | " |
| 4 | 3% $A_e$ | −20 | — | 95 | 1.182 | 0.340 | Gel |
| 5 | 3% $B_e$ | −18 | — | 90 | 1.198 | 0.342 | " |
| 6 | 10% $G_e$ | −20 | — | — | — | — | " |
| 7 | 10% $F_e$ | −40 | — | — | — | — | " |
| 8 | 0.22% $H_e$ | — | — | 40.1 | 1.212 | 0.310 | Readily disposable mixture of gel plus powder |

TABLE 3

Metallic additives (inhibitors) and the high level of hydrogen overvoltage

| | | | ALKALI SOLUTION pH = 14 | | |
|---|---|---|---|---|---|
| METAL | ELECTRODE PROCESS | | $\phi_p$ | a | b |
| 1 Aluminum | $Al + 3H_2O = Al(OH)_3 + \tfrac{3}{2}H_2$ | | −2.3 | 1.42 | 0.14 |
| 2 Zinc | $Zn + 2H_2O = ZnO_2 + 2H_2$ | | −1.4 | 1.2 | 0.12 |
| 3 Gallium | $Ga + 3H_2O = GaO_3 + 3H_2$ | | −1.4 | — | — |
| 4 Iron | $Fe + 2H_2O = Fe(OH)_2 + H_2$ | | −1.05 | 0.76 | 0.112 |
| 5 Cadmium | $Cd + 2H_2O = Cd(OH)_2 + H_2$ | | −0.834 | 1.05 | 0.16 |
| 6 Indium | $In + 2H_2O = InO_2 + 2H_2$ | | −1.0 | Not researched | |
| 7 Thallium | $2Tl + H_2O = Tl_2O + H_2$ | | −0.4 | Not researched | |
| 8 Tin | $Sn + H_2O = SnO + H_2$ | | −0.933 | 1.28 | 0.23 |
| | $SnO + 2H_2O = SnO_3 + 2H_2$ | | −1.0 | — | — |
| 9 Lead | $Pb + H_2O = PbO + H_2$ | | −0.581 | 1.36 | 0.25 |
| 10 Mercury | $Hg + H_2O = HgO + H_2$ | | +0.097 | 1.51 | 0.105 |
| | $Hg + 2H_2O = Hg(OH)_2 + H_2$ | | | | |
| 11 Hydrogen | $H_2 = 2H^+ + 2e^-$ | | −0.895 | — | — |

$\phi_p$ = Thermodynamic equilibrium potential

The principal electrochemical processes in an air-aluminum source take place in the electrolyte, as well as on the surfaces of the aluminum anode and the gas-diffusion cathode.

On account of this, the invention herein makes use of three complexes of multi-parameter additives for optimizing the battery's performance, namely:
an electrolyte additive complex;
an anode additive complex;
an cathode additive complex.

The composition of all three additive complexes is directed at achieving optimal characteristics for the battery. The choice of the optimal complexes and their compositions is aimed at reducing corrosion rate in the presence of an aqueous alkali electrolyte solution, while at the same time ensuring effective anode activity in the current-generating reaction.

The initial cause of corrosion processes is the thermodynamic instability of most materials under working conditions. For those materials, the ion or oxide state is the stable one. This is why metals and alloys tend to a spontaneous transition from the metal state to the ion one. Thermodynamics make it possible to assess the probability of a corrosion process occurring on the basis of the free energy reduction or of the EMF (electrical motion force) value of the electrochemical corrosion reaction. However, the actual corrosion rate is determined not only by the thermodynamic instability of the system but also by a number of kinetic factors.

Figure 8:
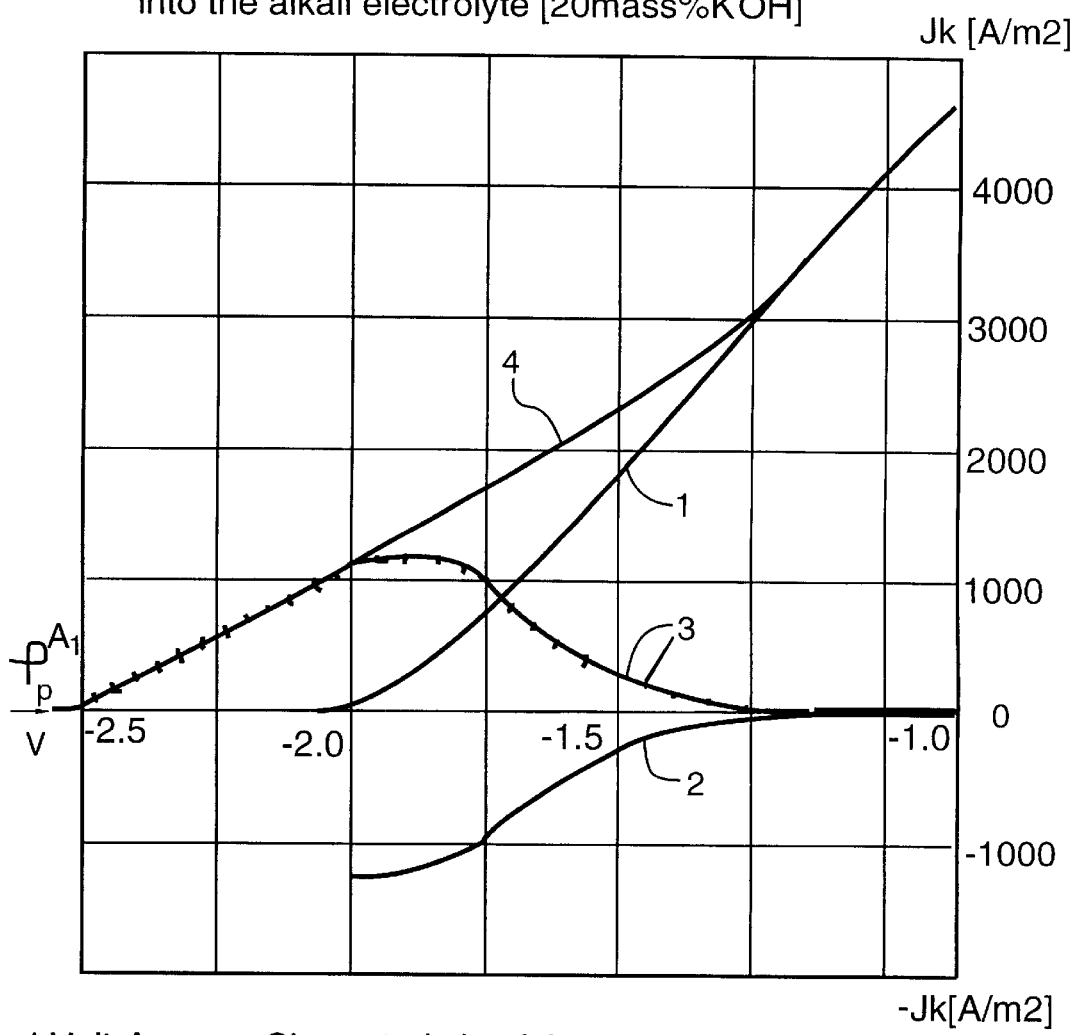
FIG. 8 is a corrosion diagram of an aluminium anode into an alkali electrolyte.

Referring to the polarization chart represented in FIG. 8, an analysis of the summarizing expression for electrochemical corrosion rate can be formulated:

$$I_{cor} = \frac{(\varphi_{pk} - \varphi_{pa})}{(d\varphi_l/dl_k - d\varphi_a/dl_a + R_{el})} \times K, \quad (10)$$

Here, the value $(\phi_{pk}-\phi_{pa})$ is the EMF of the corrosion element and is proportional to the reduction of the system's free energy during the corrosion process. The denominator of the above expression represents the general deceleration of the corrosion process and has the dimension of ohm. It is expressed by three values characterizing the kinetics (polarization ability) of the cathode $(d\phi_k/dl_k)$ and the anode $(d\phi_a/dl_a)$ processes and the ohmic resistance $R_{e1}$ between the anode and cathode areas.

Decreasing the rate of the summarizing electrochemical corrosion reaction can, in principle, be done by two methods: either by rendering the metal into a passive state by means of external anode current, or by altering the kinetics of the anode or cathode processes. This can be achieved by creating an internal current, e.g. cathode current generated by the oxidation-and-reduction reaction at the incorporation of corrosion inhibitors into the system. The following methods of reducing the reactivity of metals and alloys can be mentioned:

1. Deceleration of the anode process (anode inhibitors).
2. Increasing the polarization ability of both electrode processes (mixed inhibitors).
3. Increasing the oxidation-and-reduction potential of the system (acceleration of the cathode process).
4. Increasing the polarization ability of the cathode process (cathode inhibitors).
5. Reducing the stationary oxidation-and-reduction potential (cathode inhibitors).

The first two methods of corrosion reduction are based upon the deceleration of the anode reaction; therefore, they cannot be considered for application in a chemical power source (CPS). The third method is based upon the acceleration of the cathode reaction by means of inhibitors to the extent where passivation of the metals becomes feasible. Such inhibitors can be classified as passivators. The continuous renewal of the anode surface of the CPS makes their application problematic. The fourth and fifth methods are based on the deceleration of the cathode reaction (for example, the hydrogen reduction process) by means of inhibitors. This should decrease corrosion rate and, according to the laws of electrochemical kinetics, can lead to the shifting of the stationary metal potential in the negative direction.

A metal applied to the cathode areas of the anode surface can act as inhibitor of the cathode hydrogen deposition reaction in the process of the electrochemical corrosion of the aluminum anode (cathode inhibitor), if it has the characteristics listed below.

First, it has to have a high value of hydrogen over-tension in the electrolyte solution being considered. Second, the additive metal has to have a more positive balance potential in relation to the basic metal and the admixture metals. Third, such a metal has to be largely similar to the anode admixture metals, i.e. to have an increased adsorption energy, or be able to form chemical compounds with it, so that, after its cathode deposition from the solution all over the anode's surface, it would not stay on its anode areas but cover the cathode areas. Fourth, the metal-inhibitor compound in the electrolyte (corrosion pro-inhibitor) has to possess sufficient solubility in the initial aqueous alkaline solution and a high dissociation degree, which can have a serious effect on the electrolyte's conductivity. This factor has to be taken into account when considering the quantity of the additive to be introduced: it has to be sufficient to ensure a continuous and adequate supply of the inhibitor onto the surface, and at the same time not large enough to have a notable adverse effect on the electrolyte's conductivity. In the event that the metal-inhibitor forms soluble compounds with the alkaline electrolyte, this process should take place at quite a high rate. The metal-inhibitor can subsequently be deposited on the anode's surface for a second time from the compounds in the solution in the process of the anode's dissolution. However, due to its high similarity to the admixture metals, it will remain only on the cathode areas, decelerating the cathode hydrogen emission reaction. Such a compound, called corrosion pro-inhibitor, can be initially integrated into the solution in the required quantity.

When making the choice of the metals capable of acting as inhibitors, it is essential to consider their properties in the order of priority of the requirements listed above. Thus, zinc, cadmium, mercury, gallium, indium, thallium, tin, and lead can be singled out from among metals with high values of hydrogen over-tension in aqueous alkaline solutions (see Table 3). All of the above metals are more electropositive than aluminum and almost all of them, except zinc and gallium, are electropositive in relation to basic admixture—iron. This means that all of these metals can be deposited in contact on the aluminum anode surface and will form a coating with a high over-tension value of hydrogen deposition.

When hydrogen is emitted from aqueous solutions in the hydrogen depolarization corrosion reaction, there exists a direct dependence between the values of the corrosion current passing through the system and the over-tension generated by this phenomenon. There is also a linear dependence between over-tension ($\eta H_2$) and current density $I_{cor}$ in the area of small deviations from the balance potential $\eta < RT/zF$:

$$\eta_{H2} = A \cdot I_{cor} \tag{11}$$

Furthermore, the above linear dependence becomes a semi-logarithmic one with the divergence from the balance potential of hydrogen (with the increase of polarization):

$$\eta_{H2} = a + b \cdot \lg(I_{cor}) \tag{12}$$

The above dependence was first formulated by Taffel in 1905. As is obvious, $\eta_{H2}$ depends on $I_{cor}$, which, in turn, is the ratio of the strength current (being measured) to the overall area of the electrode.

An analysis of FIG. 8 makes it possible to represent the mechanism of hydrogen reduction from water as a series of consecutive reactions:

hydrogen atom reduction:

$$H_2O + e^- \rightleftharpoons H_{ads} + OH^-, \tag{13}$$

recombination of the absorbed hydrogen atoms:

combination of the molecules into a bubble and subsequent removal in the form of a gas.

In highly alkaline solutions (pH>14), an alkaline metal can participate in the above process:

The processes described by equations (13) to (17) take place largely on the cathode areas of the anode's surface. As for the anode areas, the electrochemical oxidation of aluminum takes place there in a current-generating reaction and corrosion reaction. Its kinetics is represented in FIG. 8 by curves 1 and 3, respectively.

It is shown that as a result of reaction (14) the constant increase of the value $H_{ads}$, must shift the balance to the right and initiate a chemical recombination reaction:

$$2H_{ads} \rightarrow H_2 \tag{18}$$

whose rate can be defined by the bi-molecular reaction equation:

According to equation (19), there has to exist a current density value at which all of the surface of the electrode where the above reaction takes place will be covered by adsorbed hydrogen. Since its concentration at this juncture is sure to reach its maximum level, this process should be considered the one determining the rate of the summarizing reaction of cathode hydrogen emission. It is evident that the hydrogen atom concentration has to depend on the electrode's surface structure. After the maximum concentration $H_{ads}$, occurring at the complete filling of the surface, has been reached, no further increase of the rate of the reaction described by equation (19) is possible. The corrosion current strength will reach its maximum level determined by the composition of the cathode areas, their sizes and shapes.

The research carried out has demonstrated that the corrosion of the aluminum anode occurs according to the electrochemical mechanism. The rate of the said process is determined by the kinetics of the cathode hydrogen emission. A complex study of the water decomposition mechanism has shown that the limiting stage there is the intermediate chemical stage of the recombination of adsorbed hydrogen atoms into molecules. Corrosion rate is largely determined by the composition, sizes and shapes of the cathode area on the anode's surface. By modifying their characteristics, it is possible to control the rate of the summarizing corrosion process of the aluminum anode in alkaline electrolytes with the purpose of decreasing it.

FIGS. 9 to 15 show the data obtained by experiments conducted with the purpose of determining the optimal composition of the complexes of multi-parameter additives for the anode, cathode and electrolyte, as well as their compositions.

It will be appreciated that the above description relates to the preferred embodiments by way of example only. Many variations on the invention will be obvious to those knowledgeable in the field, and such obvious variations are within the scope of the invention as described and claimed, whether or not expressly described.

We claim:

1. A battery comprising:
   at least one non-consumable gas diffusion positive electrode;
   at least one consumable negative metal electrode;
   an electrolyte based on water solutions of salts and/or bases; and
   a housing enclosing said electrolyte, said at least one positive electrode and said at least one negative electrode, to create an inter-electrode gap, wherein said at least one negative electrode comprises a metal selected from the group consisting of aluminum, zinc, magnesium, and alloys thereof, and further comprises an effective amount of one or more additives selected from the group consisting of Ga, In, TI, Sn, Cd, Pb, Mn, and Fe, said effective amount of said additives improving the electrochemical characteristics of said at least one negative electrode, reducing corrosion, and preserves said at least one negative electrode while being stored.

2. A battery according to claim 1, wherein said additives are present in the following concentrations:
   Ga 0–5 mass %, In 0–5 mass %, TI 0–5 mass %, Sn 0–5 mass %, Cd 0–5 mass %, Pb 0–5 mass %, Mn 0–5 mass % and Fe 0–5 mass %.

3. A battery according to claim 2, wherein said additives are present in the following concentrations:
   Ga 0.01 mass %, In 0.5 mass %, TI 0.015 mass %, Sn 0.15 mass %, Cd 0.01 mass %, Pb 0.02 mass %, Mn 0.03 mass % and Fe 0.01 mass %.

4. A battery according to claim 1, wherein a thickness of said at least one negative electrode is in the range of 0.05 mm to 10 mm, and a volume of said electrolyte is selected to achieve balanced consumption during the discharge of said battery.

5. A battery according to claim 1, wherein said electrolyte is a salt solution, an alkali solution or a mixture of a salt solution and an alkali solution, said electrolyte further having an addition of $Sn^{+4}$, $Pb^{+4}$, $Ga^{+3}$, $In^{+3}$, poly-saccharide based on D-glucose, polyesters including amides, 2–3 C alcohols and halogenides/hydroxides of alkaline metals, to provide a decrease in anode corrosion during discharge, an increase in electric capacity of said electrolyte, a decrease of freezing temperature of said electrolyte, a change of chemical reaction results into microcrystalline form and stabilization of said electrolyte during storage.

6. A battery according to claim 5, wherein said electrolyte comprises 0–30% KOH, 0–0.1 mol/l Sn, 0–0.1 mol/l Pb, 0–0.1 mol/l Ga, 0–0.1 mol/l In, 0–10 mass % D-glucose, 0–5 mass % alcohols, 0–5 mass % polyester and 0–20 mass % NaCl.

7. A battery according to claim 6, wherein said electrolyte comprises 20% KOH, 0.06 mol/l Sn, 0.02 mol/l Pb, 0.01 mol/l Ga, 0.02 mol/l In, 5 mass % D-glucose, 2 mass % alcohols and 15 mass % NaCl.

8. A battery according to claim 6, wherein said electrolyte comprises 0.02 mol/l Pb, 0.06 mol/l Sn, 0.01 mol/l Ga, 0.02 mol/l In, 5 mass % D-glucose, 2 mass % alcohols, 2 mass % polyester and 15 mass % NaCl.

9. A battery according to claim 1, wherein said first unit further comprises a porous matrix—electro-carrier, soaked in a composition based on a salt solution, an alkali solution or a mixture of a salt solution and an alkali solution, said porous matrix electro-carrier further having an addition of $Sn^{+4}$, $Pb^{+4}$, $Ga^{+3}$, $In^{+3}$, poly-saccharide based on D-glucose, poly-esters including amides, 2–3 C alcohols and halogenides/hydroxides of alkaline metals, to provide a decrease in negative electrode corrosion during discharge, an increase in electric capacity of electrolyte, a decrease of freezing temperature of said electrolyte, a change of chemical reaction results into microcrystalline form and stabilization of said electrolyte during storage.

10. A battery according to claim 1, wherein said at least one positive electrode comprises additives selected from the group consisting of lead oxides and silver-indium alloys, to provide stabilization of properties during extended storage of said positive electrode and increase in electrochemical activity while the battery is in use.

11. A battery according to claim 10, wherein at least one of said additives is incorporated into said at least one positive electrode comprising less than about 200 mg/cm3 of a total surface area of said at least one positive electrode.

12. A battery according to claim 1, wherein said first unit comprises at least one membrane, said membrane being permeable to hydrogen and impermeable to liquids.

13. A battery according to claim 1, wherein said at least one positive electrode is provided with at least one fourth cavity, which is fillable with said electrolyte.

14. A battery according to claim 1, wherein said inter-electrode gap is chosen to be the minimal possible based on construction consideration, and wherein a necessary reserve of said electrolyte is contained in at least one fifth cavity arranged in said first unit and in at least one sixth cavity arranged in said second unit.

15. A battery according to claim 1, wherein said at least one negative electrode covers said at least one positive electrode in the shape of a pocket, said pocket being connected to surrounding atmosphere.

16. A battery according to claim 1, wherein said at least one negative electrode is substantially U-shaped and covers said electrolyte impermeable container.

17. A battery according to claim 1, wherein said first unit further comprises a current converter, said current converter providing conversion of a direct current of said battery into an alternating current and stabilization of a voltage output by said battery.

18. A battery according to claim 1, wherein said first unit further comprises a current converter, said current converter providing conversion of a direct voltage of said battery into a different level of voltage and stabilization of said voltage output by said battery.

19. A battery according to claim 1, wherein said at least one negative electrode comprises a hydrate metal oxide.

20. A battery according to claim 1, wherein said at least one negative electrode comprises aluminum.

21. A battery according to claim 20, wherein said at least one negative electrode comprises aluminium obtained following the Bayra process.

22. A battery according to claim 1, wherein said at least one negative electrode has a thickness of between 0.04 to 0.5 of a positive electrode spacing inside a volume of an active part of said second unit.

23. A battery according to claim 1, wherein said battery further comprises:
   a first unit, comprising said housing with said at least one positive electrode and said electrolyte, said electrolyte being held in an electrolyte impermeable container, and
   a second unit, comprising said at least one negative metal electrode and said electrolyte,
      said second unit being replaceably and sealingly arranged in said first unit, so that when said at least one negative electrode and said electrolyte are consumed, the spent second unit is removed and a fresh second unit is inserted instead of the spent second unit, and said electrolyte impermeable container is penetrated by a puncture means after said second unit has been fully inserted into said first unit, to allow said electrolyte to flow between said at least one positive electrode and said at least one negative electrode.

24. A battery according to claim 23, wherein said battery further comprises at least one first conduit for connecting to and distributing ambient air, at least one second conduit for distributing said electrolyte, and at least one third conduit for collecting reaction products in cooperation with said at least one first conduit and said at least one second conduit.

25. A battery according to claim 23, wherein said puncture element comprises a substantially U-shaped element having sharp ends, said puncture element being arranged inside said electrolyte impermeable container, and said battery further comprises a biasing means for pressing said electrolyte impermeable container against said sharp ends, to cause said electrolyte impermeable container to break.

26. A battery according to claim 25, wherein said biasing means comprises a thread, which is attached to said electrolyte impermeable container.

27. A battery according to claim 25, wherein said biasing means comprises a push bar having a foot end, which contacts said electrolyte impermeable container.

28. A battery according to claim 23, wherein said at least one positive electrode and said at least one negative electrode form pairs of one positive electrode and one negative electrode, and said pairs are connected in series to produce a desired output voltage.

29. A battery according to claim 23, wherein said at least one positive electrode and said at least one negative electrode form pairs of one positive electrode and one negative electrode, and said pairs are connected in parallel to produce a desired output current.

30. A battery according to claim 23, wherein said first unit further comprises at least one first sealing means, forming a hermetic seal between said first unit and said second unit when said first unit and said second unit are engaged.

31. A battery according to claim 23, wherein said second unit further comprises at least one second sealing means, forming a hermetic seal between said first unit and said second unit when said first unit and said second unit are engaged.

32. A battery according to claim 23, wherein said first unit further comprises at least one first sealing means and said second unit further comprises at least one second sealing means, said first sealing means and said second sealing means cooperating to form a hermetic seal between said first unit and said second unit when said first unit and said second unit are engaged.

33. A battery according to claim 23, wherein said at least one positive electrode is removably arranged in said first unit, to provide a possibility to replace said at least one positive electrode.

34. A battery according to claim 23, wherein said battery further comprises a cap portion, said cap portion comprising a third sealing means and a releasable locking means, said third sealing means providing a hermetic seal between said first unit and said second unit, when said first unit and said second unit are engaged, and said releasable locking means is configured to maintain said body and said second unit in an engaged configuration until released.

* * * * *